US010538107B2

(12) United States Patent
Abe et al.

(10) Patent No.: US 10,538,107 B2
(45) Date of Patent: Jan. 21, 2020

(54) PRINTING APPARATUS, PRINTING METHOD, AND PRINTING SYSTEM

(71) Applicant: CANON KABUSHIKI KAISHA, Tokyo (JP)

(72) Inventors: Seiji Abe, Kawasaki (JP); Yumi Yanai, Yokohama (JP); Tetsuya Edamura, Inagi (JP); Junichi Nakagawa, Tokyo (JP); Kouta Murasawa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/356,988

(22) Filed: Mar. 18, 2019

(65) Prior Publication Data
US 2019/0291460 A1 Sep. 26, 2019

(30) Foreign Application Priority Data

Mar. 22, 2018 (JP) .................................. 2018-054867

(51) Int. Cl.
B41J 2/21 (2006.01)
H04N 1/40 (2006.01)
H04N 1/405 (2006.01)

(52) U.S. Cl.
CPC ........... B41J 2/2139 (2013.01); B41J 2/2142 (2013.01); H04N 1/4053 (2013.01); H04N 1/40087 (2013.01)

(58) Field of Classification Search
CPC .. B41J 2/2142; H04N 1/40087; H04N 1/4053
See application file for complete search history.

(56) References Cited

U.S. PATENT DOCUMENTS

2012/0206532 A1* 8/2012 Kim ...................... B41J 2/0451
347/19
2014/0002527 A1* 1/2014 Kido ..................... B41J 2/2142
347/14

FOREIGN PATENT DOCUMENTS

JP 10-6488 A 1/1998

* cited by examiner

Primary Examiner — Quang N Vo
(74) Attorney, Agent, or Firm — Canon U.S.A., Inc. IP Division

(57) ABSTRACT

From among a plurality of elements included in a printing head and arrayed in a predetermined direction, a faulty element that is unable to form dots properly on a printing medium is identified. At least one of correction processing for increasing a value of multi-valued input image data corresponding to the faulty element and correction processing for decreasing a threshold in a quantization process for the faulty element is performed. Complementary dot data is generated for the faulty element by taking the dot data generated for the identified faulty element as dot data corresponding to an element near the identified faulty element in the predetermined direction.

20 Claims, 17 Drawing Sheets

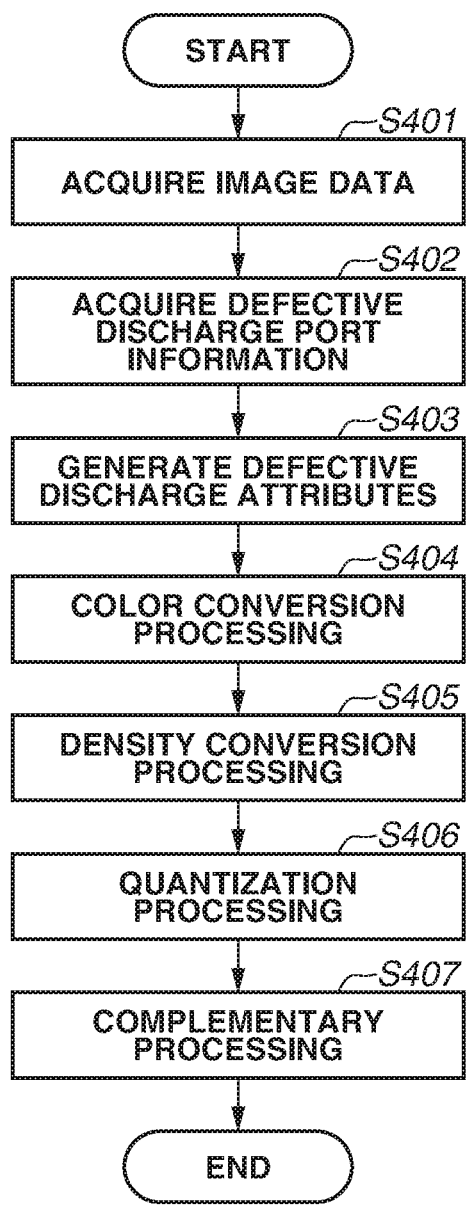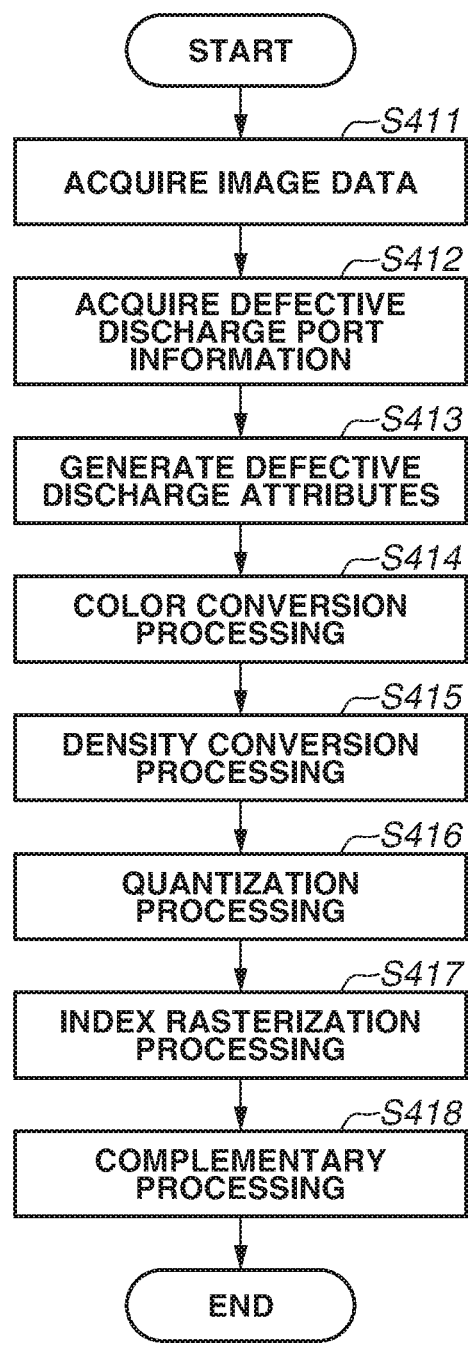

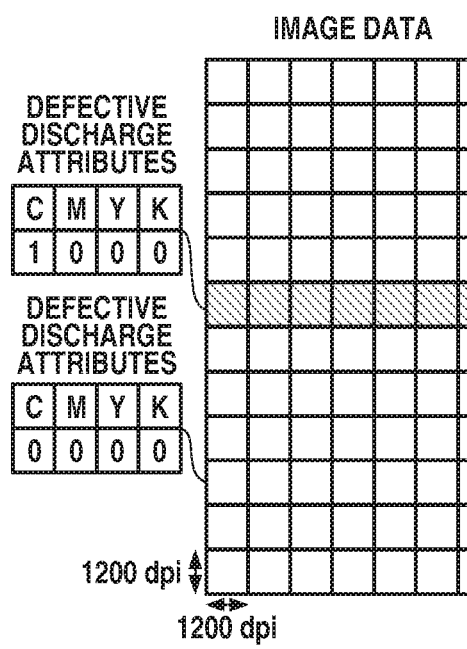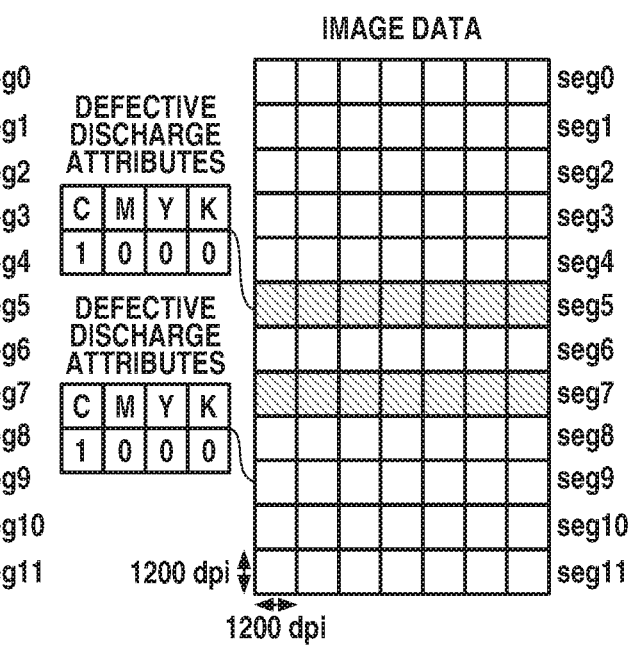

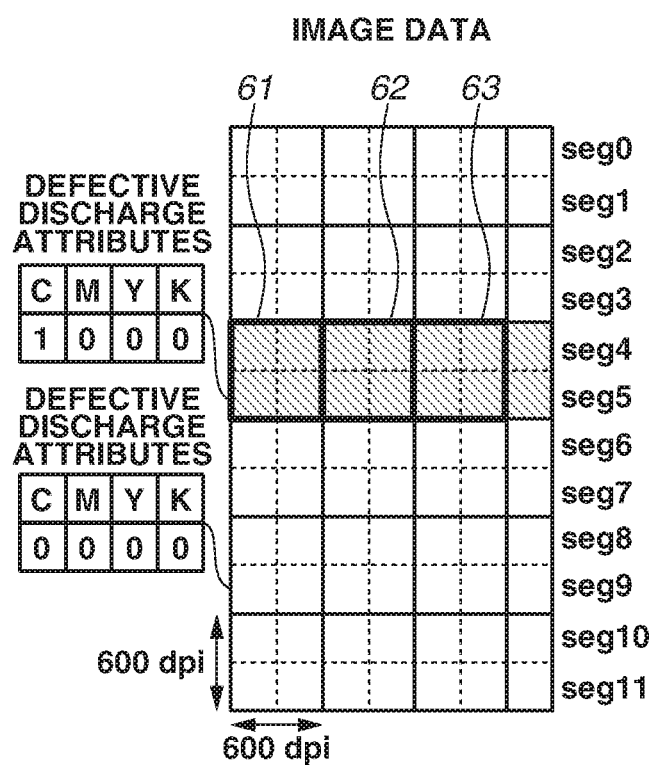

FIG.7A

CYAN DISCHARGE PORTS / DEFECTIVE DISCHARGE PORT INFORMATION ABOUT CYAN

| segment | value |
|---|---|
| seg0 | 0 |
| seg1 | 0 |
| seg2 | 0 |
| seg3 | 0 |
| seg4 | 0 |
| seg5 | 1 |
| seg6 | 0 |
| seg7 | 0 |
| seg8 | 0 |
| seg9 | 2 |
| seg10 | 0 |
| seg11 | 0 |

FIG.7B

IMAGE DATA

DEFECTIVE DISCHARGE ATTRIBUTES

| C | M | Y | K |
|---|---|---|---|
| 1 | 0 | 0 | 0 |

DEFECTIVE DISCHARGE ATTRIBUTES

| C | M | Y | K |
|---|---|---|---|
| 2 | 0 | 0 | 0 |

1200 dpi / 1200 dpi

FIG.9A
| 1200 dpi | C | M | Y | K |
|---|---|---|---|---|
| MEDIUM 1 | 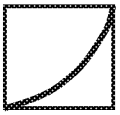 | 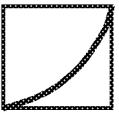 | 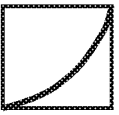 | 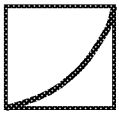 |
| MEDIUM 2 | 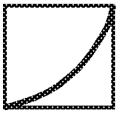 | 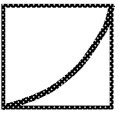 | 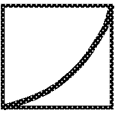 | 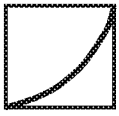 |
| ⋮ | | | | |
| MEDIUM X |  | 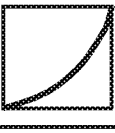 | 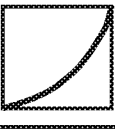 | 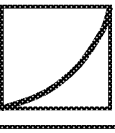 |
FIG.9B
| 600 dpi | C | M | Y | K |
|---|---|---|---|---|
| MEDIUM 1 | 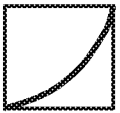 | 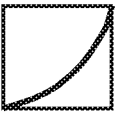 | 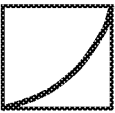 | 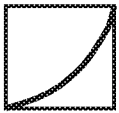 |
| MEDIUM 2 | 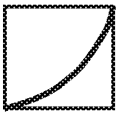 | 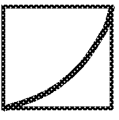 | 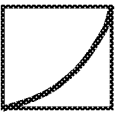 | 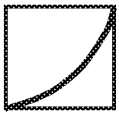 |
| ⋮ | | | | |
| MEDIUM X | 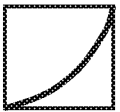 | 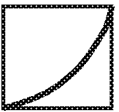 | 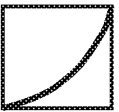 | 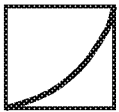 |

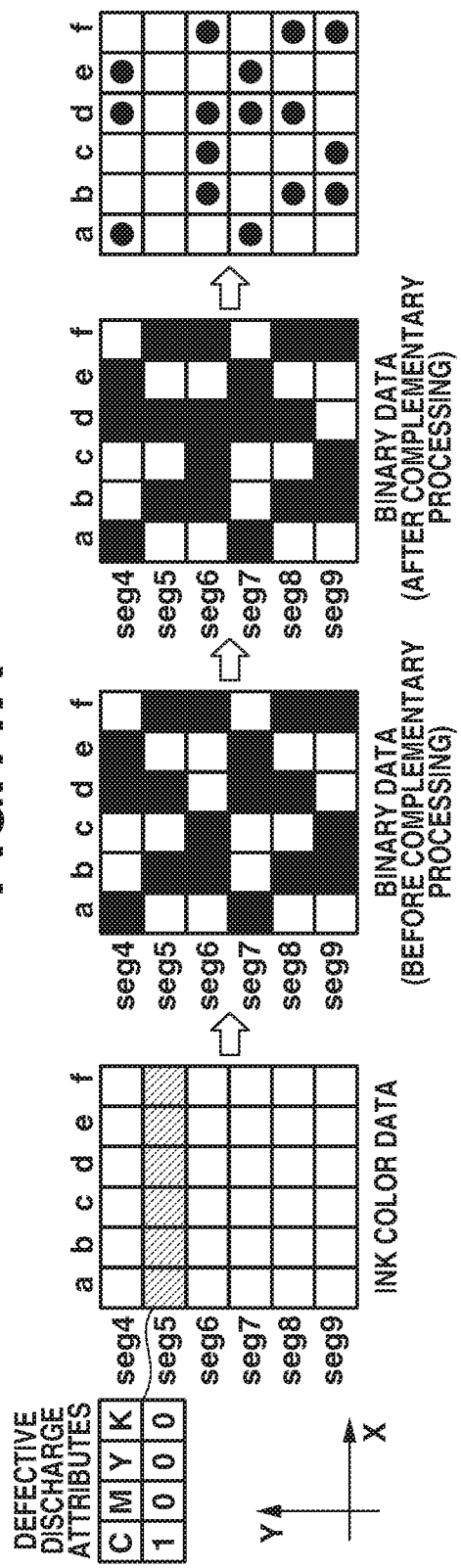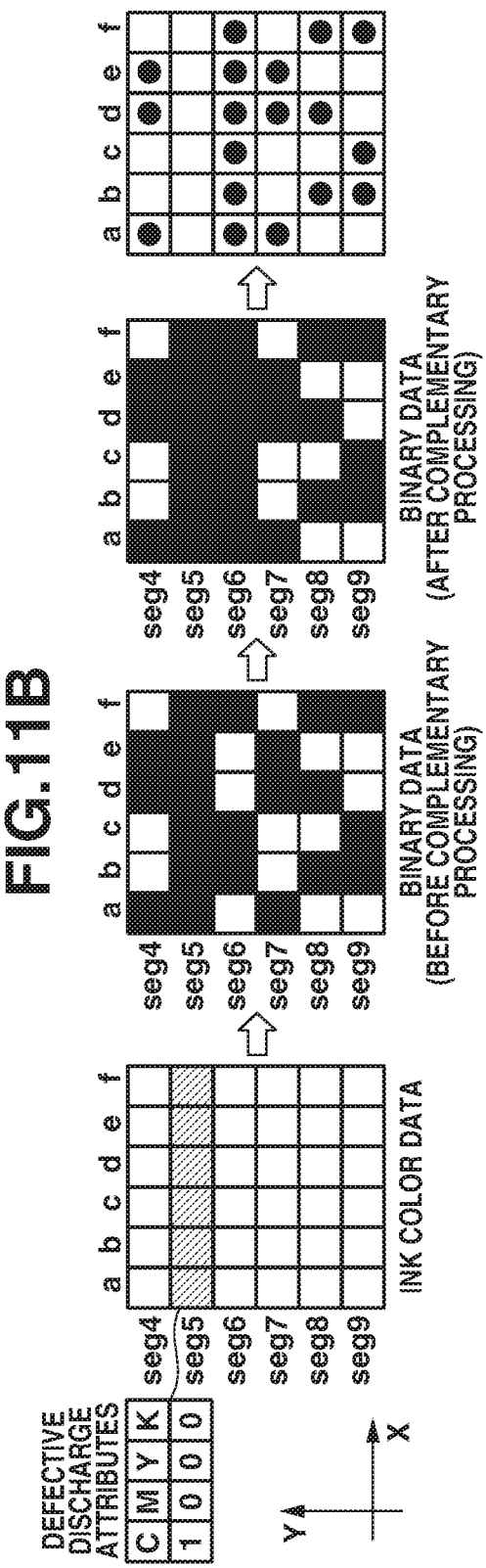

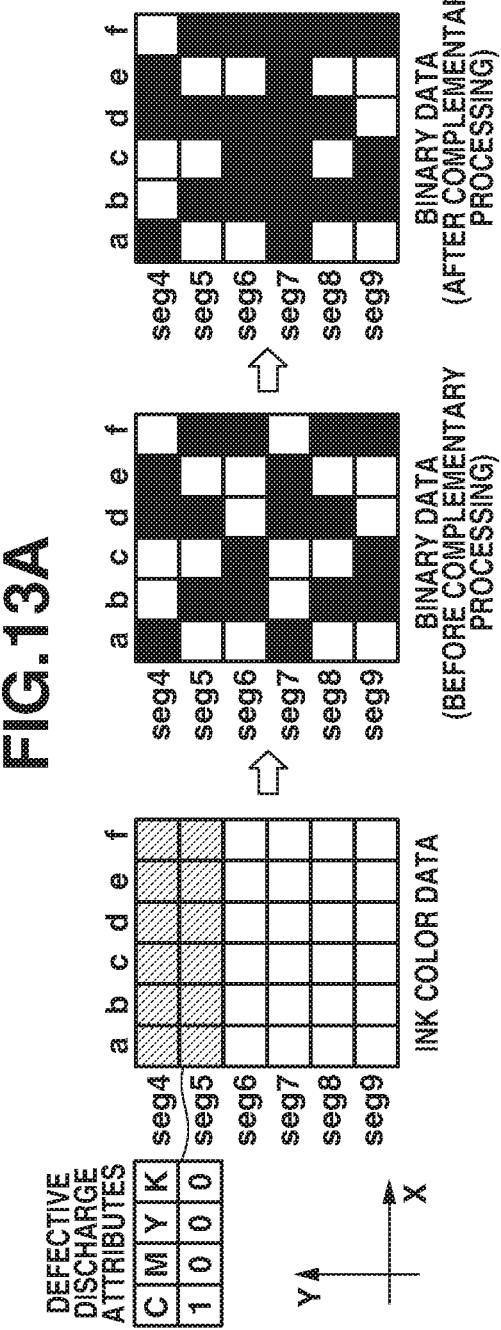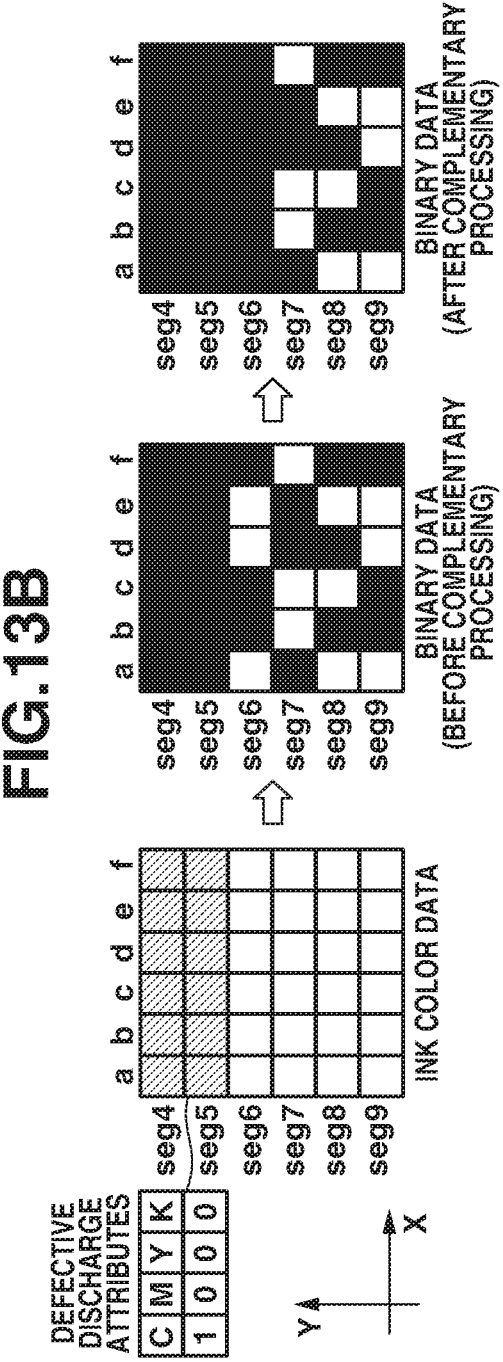

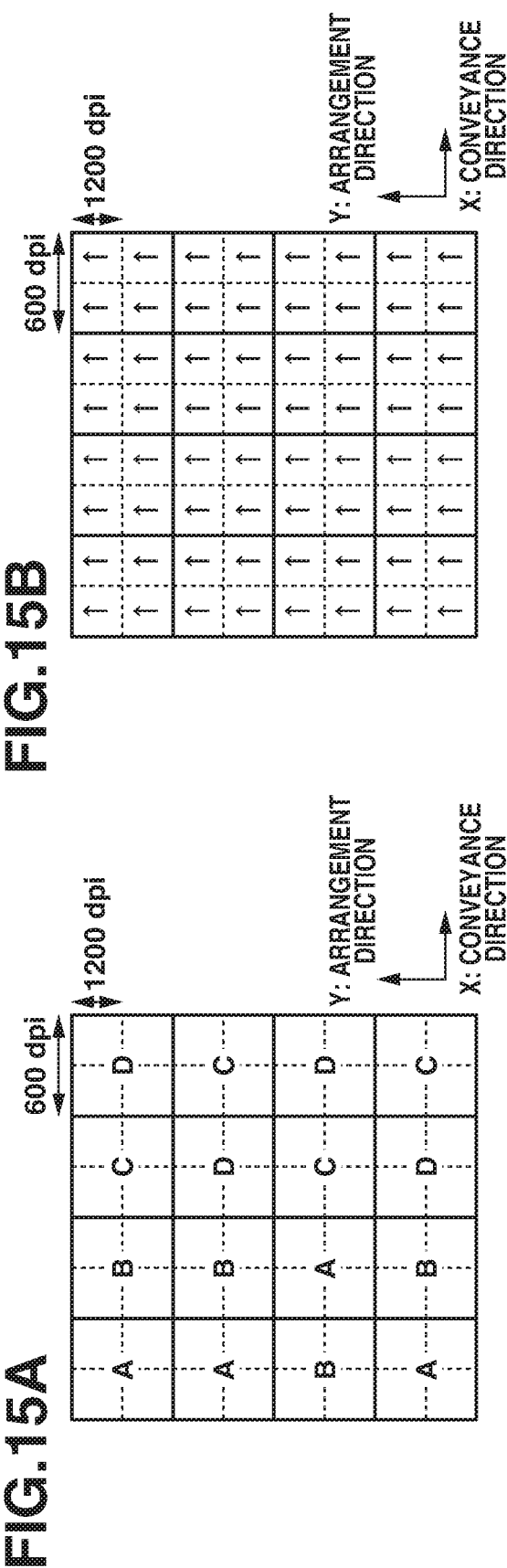
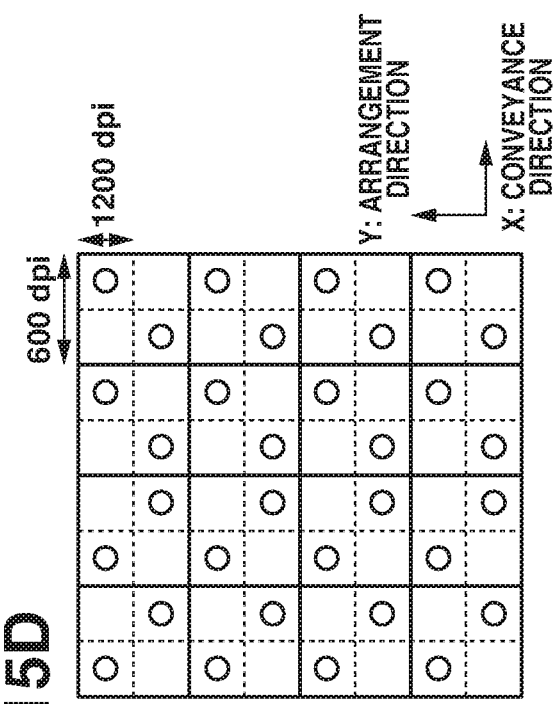
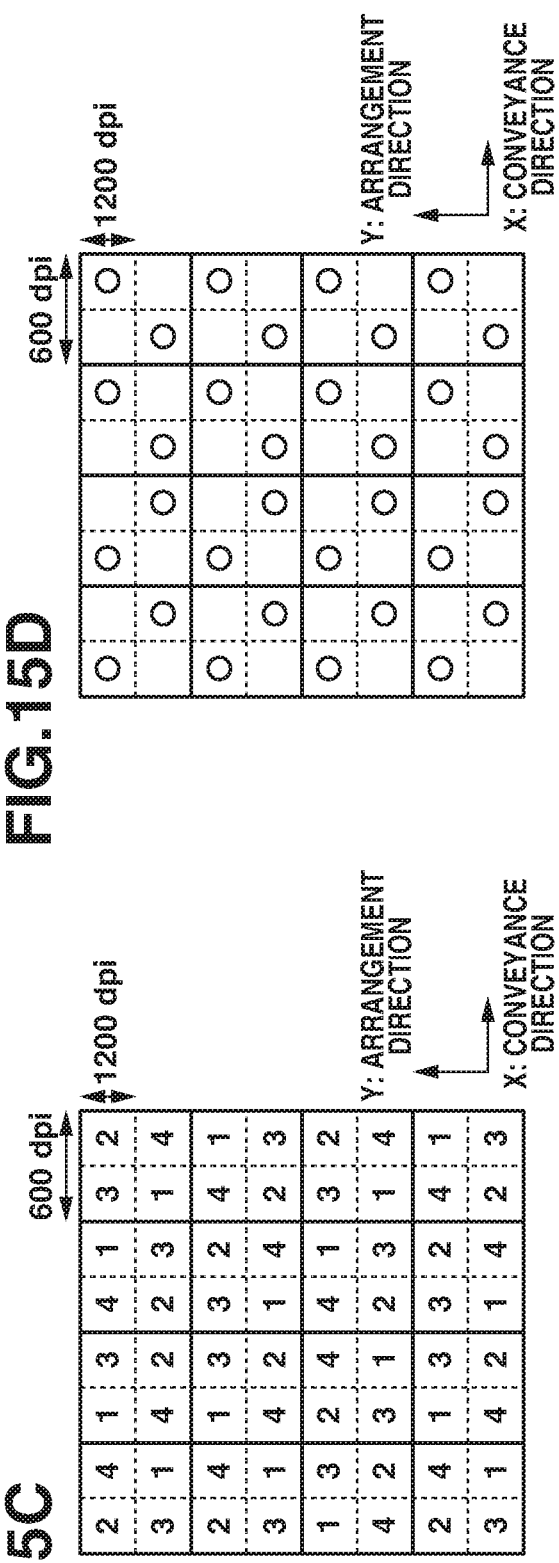

FIG.16A

256 PIXELS

256 PIXELS

| 2617 | 1767 | 3505 | 2321 | 3642 | | 3832 | 2084 | 1611 | 473 | 2511 |
|---|---|---|---|---|---|---|---|---|---|---|
| 1091 | 3124 | 872 | 2755 | 1109 | | 2482 | 3266 | 851 | 3042 | 1460 |
| 2270 | 462 | 3928 | 273 | 2155 | ····· | 36 | 1271 | 3761 | 2165 | 138 |
| 1533 | 3391 | 1996 | 1599 | 3307 | | 3994 | 1963 | 533 | 2620 | 3643 |
| 2712 | 1015 | 654 | 2534 | 3623 | | 2711 | 1570 | 3461 | 1012 | 1739 |

| 1433 | 2861 | 1181 | 3376 | 624 | | 56 | 3519 | 1773 | 1079 | 288 |
|---|---|---|---|---|---|---|---|---|---|---|
| 4023 | 586 | 1922 | 204 | 2654 | | 1275 | 3171 | 2544 | 3908 | 2208 |
| 3457 | 2395 | 3149 | 3632 | 1656 | ····· | 965 | 312 | 1533 | 699 | 2865 |
| 1681 | 349 | 976 | 1414 | 714 | | 2472 | 3702 | 2079 | 3317 | 168 |
| 3073 | 2238 | 3780 | 2868 | 2100 | | 1831 | 565 | 2678 | 1325 | 1894 |

FIG.16B

256 PIXELS

256 PIXELS

| 1309 | 884 | 1753 | 1161 | 1821 | | 1916 | 1042 | 806 | 237 | 1256 |
|---|---|---|---|---|---|---|---|---|---|---|
| 546 | 1562 | 436 | 1378 | 555 | | 1241 | 1633 | 426 | 1521 | 730 |
| 1135 | 231 | 1964 | 137 | 1078 | ····· | 18 | 636 | 1881 | 1083 | 69 |
| 767 | 1696 | 998 | 800 | 1654 | | 1997 | 982 | 267 | 1310 | 1822 |
| 1356 | 508 | 327 | 1267 | 1812 | | 1356 | 785 | 1731 | 506 | 870 |

| 717 | 1431 | 591 | 1688 | 312 | | 28 | 1760 | 887 | 540 | 144 |
|---|---|---|---|---|---|---|---|---|---|---|
| 2012 | 293 | 961 | 102 | 1327 | | 638 | 1586 | 1272 | 1954 | 1104 |
| 1729 | 1198 | 1575 | 1816 | 828 | ····· | 483 | 156 | 767 | 350 | 1433 |
| 841 | 175 | 488 | 707 | 357 | | 1236 | 1851 | 1040 | 1659 | 84 |
| 1537 | 1119 | 1890 | 1434 | 1050 | | 916 | 283 | 1339 | 663 | 947 |

MULTI-VALUED DATA

QUANTIZATION THRESHOLD

BINARY DATA
(BEFORE NUMBER OF
DOTS IS INCREASED)

BINARY DATA
(AFTER NUMBER OF
DOTS IS INCREASED)

PRINTING APPARATUS, PRINTING METHOD, AND PRINTING SYSTEM

BACKGROUND OF THE INVENTION

Field of the Invention

The aspect of the embodiments relates to a printing apparatus, a printing method, and a system for performing printing on a printing medium based on data.

Description of the Related Art

There is known an ink jet printing apparatus that includes a printing head in which a plurality of ink discharge ports is arrayed. Such an ink jet printing apparatus prints an image on a printing medium by discharging ink from the individual discharge ports and forming dots on the printing medium based on dot formation data. These discharge ports of such printing apparatus are arranged at positions corresponding to elements that generate energy used for discharging ink. There is also known a thermal printer that performs printing on thermal paper by using elements that generate heat when these elements are energized.

For example, if foreign particles attach to a part of the plurality of discharge ports of this printing apparatus or if an element of this printing apparatus does not operate properly, the corresponding element may fail to form a dot properly. In this case, a dot is not formed at a position where an image is supposed to be printed by the corresponding element, which does not operate properly, and a stripe appears in the resultant image.

Japanese Patent Application Laid-Open No. 10-6488 discusses a method for complementing a defective discharge port by using a discharge port that neighbors this defective discharge port. More specifically, if a part of the plurality of discharge ports malfunctions, this printing apparatus complements the defective discharge port by forming an additional dot near the position where the image is supposed to be printed by this discharge port.

However, even if the method discussed in Japanese Patent Application Laid-Open No. 10-6488 is used, or even if a discharge port that neighbors the defective discharge port is used, depending on a dot arrangement determined based on the original image data, the defective discharge port may not be complemented sufficiently. If additional dot formation is allowed at a candidate position to form the complementary dots, the dots formed by the defective discharge port can be complemented. However, if no more additional dot can be formed at the position, no complementary dot can be added to the position.

The aspect of the embodiments is directed to performing more effective complementary printing by using an element at a position near an element that is unable to form a dot properly.

SUMMARY OF THE INVENTION

According to an aspect of the embodiments, there is provided an apparatus including a printing head provided with a plurality of elements arrayed in a predetermined direction for forming dots on a printing medium and configured to form dots on the printing medium by using the plurality of elements based on dot data indicating whether to form dots, a generation unit configured to generate the dot data for the plurality of elements by performing a quantization process on multi-valued input image data, an acquisition unit configured to acquire identification information that identifies a faulty element that is unable to form dots properly on the printing medium from among the plurality of elements, and a complementary unit configured to generate complementary dot data for the faulty element by taking the dot data generated for the identified faulty element as dot data corresponding to an element near the identified element in the predetermined direction, wherein, in a case where one element of the elements is identified as a faulty element, the generation unit performs at least one of correction processing for increasing a value of the multi-valued input image data for a pixel corresponding to the one element and correction processing for decreasing a threshold in the quantization process for the pixel corresponding to the one element.

Further features of the disclosure will become apparent from the following description of exemplary embodiments with reference to the attached drawings.

BRIEF DESCRIPTION OF THE DRAWINGS

FIGS. 4A and 4B are flowcharts each illustrating image processing according to the exemplary embodiments.

FIGS. 5A to 5D are diagrams illustrating discharge ports, defective discharge port information, and defective discharge attributes according to the exemplary embodiments.

FIGS. 6A and 6B are diagrams illustrating discharge ports, defective discharge port information, and defective discharge attributes according to the exemplary embodiments.

FIGS. 7A and 7B are diagrams illustrating discharge ports, defective discharge port information, and defective discharge attributes according to the exemplary embodiments.

FIGS. 9A and 9B are tables illustrating output gamma storage modes according to the exemplary embodiments.

FIGS. 11A and 11B are diagrams illustrating complementary processing according to the exemplary embodiments.

FIGS. 13A and 13B are diagrams illustrating complementary processing according to the exemplary embodiments.

FIGS. 15A to 15D are diagrams illustrating an example of binary data generated according to the exemplary embodiments.

FIGS. 16A and 16B are matrixes illustrating thresholds used in a dither method in quantization processing according to the exemplary embodiments.

DESCRIPTION OF THE EMBODIMENTS

Figure 1:
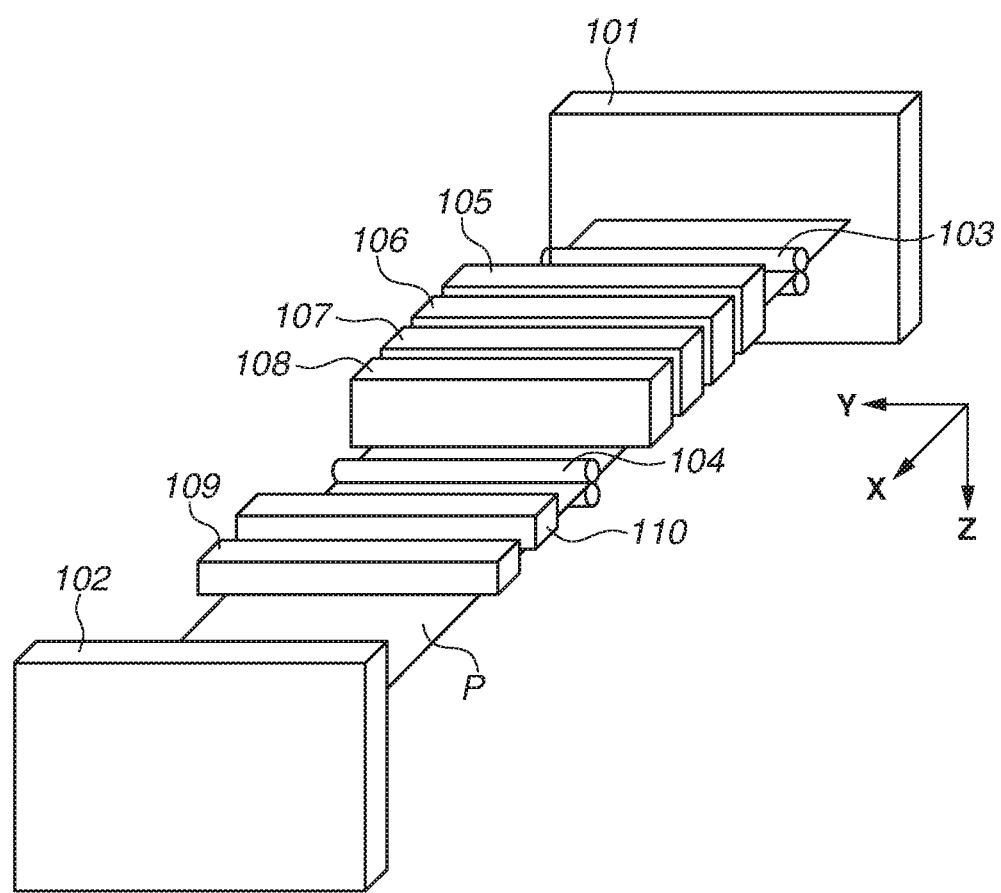
FIG. 1 is a diagram illustrating an internal configuration of a printing apparatus according to exemplary embodiments.

FIG. 1 is a perspective view illustrating an internal configuration of an ink jet printing apparatus (hereinafter referred to as a printing apparatus) according to a first exemplary embodiment.

A printing medium P that has been supplied from a feeding unit 101 is conveyed at a predetermined speed in an X direction (conveyance direction) while being sandwiched by conveyance roller pairs 103 and 104, and a discharging unit 102 discharges the printing medium P. Printing heads 105 to 108 are arrayed in the conveyance direction between the upstream conveyance roller pair 103 and the downstream conveyance roller pair 104. These printing heads 105 to 108 discharge ink in a Z direction based on binary data that determines whether to discharge ink dots. The printing heads 105 to 108 discharge cyan, magenta, yellow, and black ink, respectively. Each of discharge ports of the printing heads 105 to 108 discharges about 6 picoliter (pl) of ink in a single discharge operation. The discharge ports of each of the printing heads 105 to 108 are arranged over an entire width of the printing medium P in a Y direction. Such printer is referred to as a full-line printer. In addition, the ink of the above-described colors is supplied to the printing heads 105 to 108 via tubes (not illustrated).

A scanner controller 139 can optically read an image printed on the printing medium P by controlling a scanner 110. The scanner 110 is arranged downstream of the printing head 108 in the X direction, and reading elements are arranged at predetermined intervals in a direction parallel to the printing heads 105 to 108.

In the present exemplary embodiment, the printing medium P may be continuous paper held in a roll form in the feeding unit 101 or a cut sheet that is cut into a standard size. In a case where the printing medium P is the continuous paper, after the printing heads 105 to 108 complete their respective printing operations, a cutter 109 cuts the continuous paper at a rear end of an image, and the discharging unit 102 discharges the printing medium P onto a discharge tray (not illustrated).

The printing apparatus according to the present exemplary embodiment is not limited to the full-line type printing apparatus as described above. For example, the present exemplary embodiment is also applicable to a serial type printing apparatus that performs printing by moving a printing head in a direction intersecting with the conveyance direction of the printing medium. In addition, while the present exemplary embodiment uses an example in which the printing apparatus includes a printing head for each ink color, the present exemplary embodiment is also applicable to a mode in which a single printing head discharges ink of a plurality of colors. In addition, the present exemplary embodiment is also applicable to a mode in which a nozzle array corresponding to ink of a plurality of colors is arranged on a single discharge substrate.

Figure 2A:
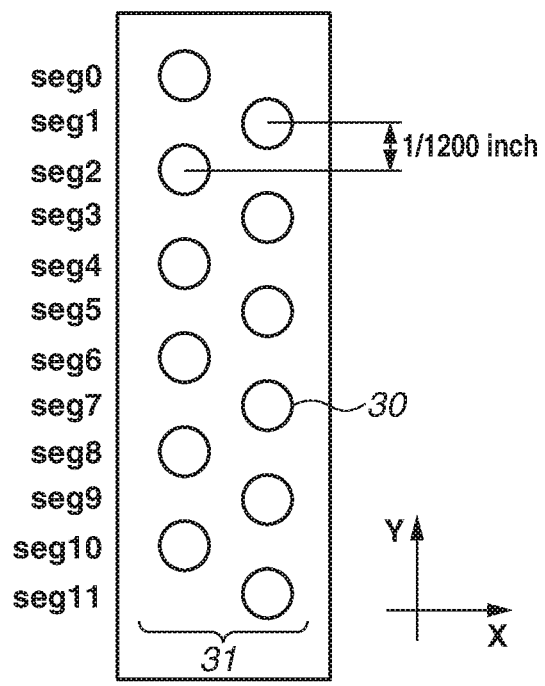
FIGS. 2A and 2B are diagrams each illustrating printing heads according to the exemplary embodiments.

FIG. 2A schematically illustrates the printing head 105 according to the present exemplary embodiment. While FIG. 2A illustrates only the printing head 105 for cyan ink from among the printing heads 105 to 108, the other printing heads 106 to 108 have the same configuration as that of the printing head 105. In addition, there is provided an electrothermal conversion element (not illustrated) as a printing element for forming dots for each of discharge ports 30 arranged in the printing head 105. The electrothermal conversion element is driven to generate thermal energy, and ink is discharged from the corresponding discharge port 30. A piezoelectric element, an electrostatic element, or a microelectromechanical systems (MEMS) element may alternatively be used in place of the electrothermal conversion element.

Figure 2B:
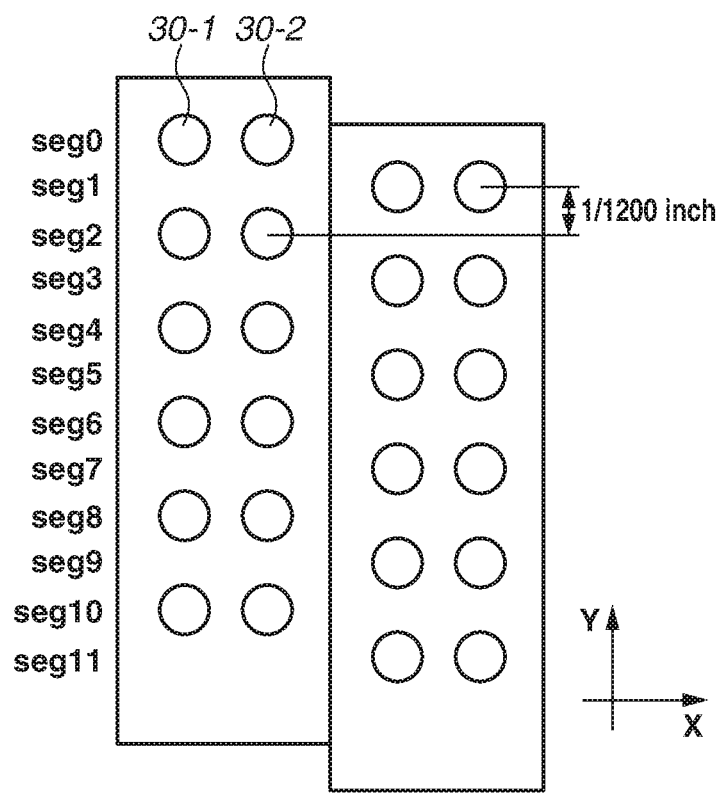

In the printing head 105, 12 discharge ports seg0 to seg11 for discharging ink are arrayed in a predetermined direction. In the example in FIG. 2A, a discharge port array 31 is formed of the plurality of discharge ports arrayed in the Y direction (array direction) intersecting with the X direction. More specifically, the discharge port array 31 is formed of a sub-array including discharge ports seg0, seg2, seg4, seg6, seg8, and seg10 and a sub-array including discharge ports seg1, seg3, seg5, seg7, seg9, and seg11. These sub-arrays are separated from each other by $\frac{1}{1,200}$ inches in the Y direction. For convenience of description and illustration, there is described the printing head 105 that includes the nozzle array formed of the 12 discharge ports seg0 to seg11 only. However, in practice, the printing head 105 includes discharge ports over a printable range of an entire width of the printing medium in the Y direction. In addition, while FIG. 2A illustrates a mode in which the single discharge port array 31 is formed of the two sub-arrays, the discharge port array 31 may also be formed of only one array. Alternatively, the printing head 105 may include four discharge port arrays as illustrated in FIG. 2B. The descriptions below will be made on an assumption that the X and Y directions are perpendicular or substantially perpendicular to each other.

Figure 3:
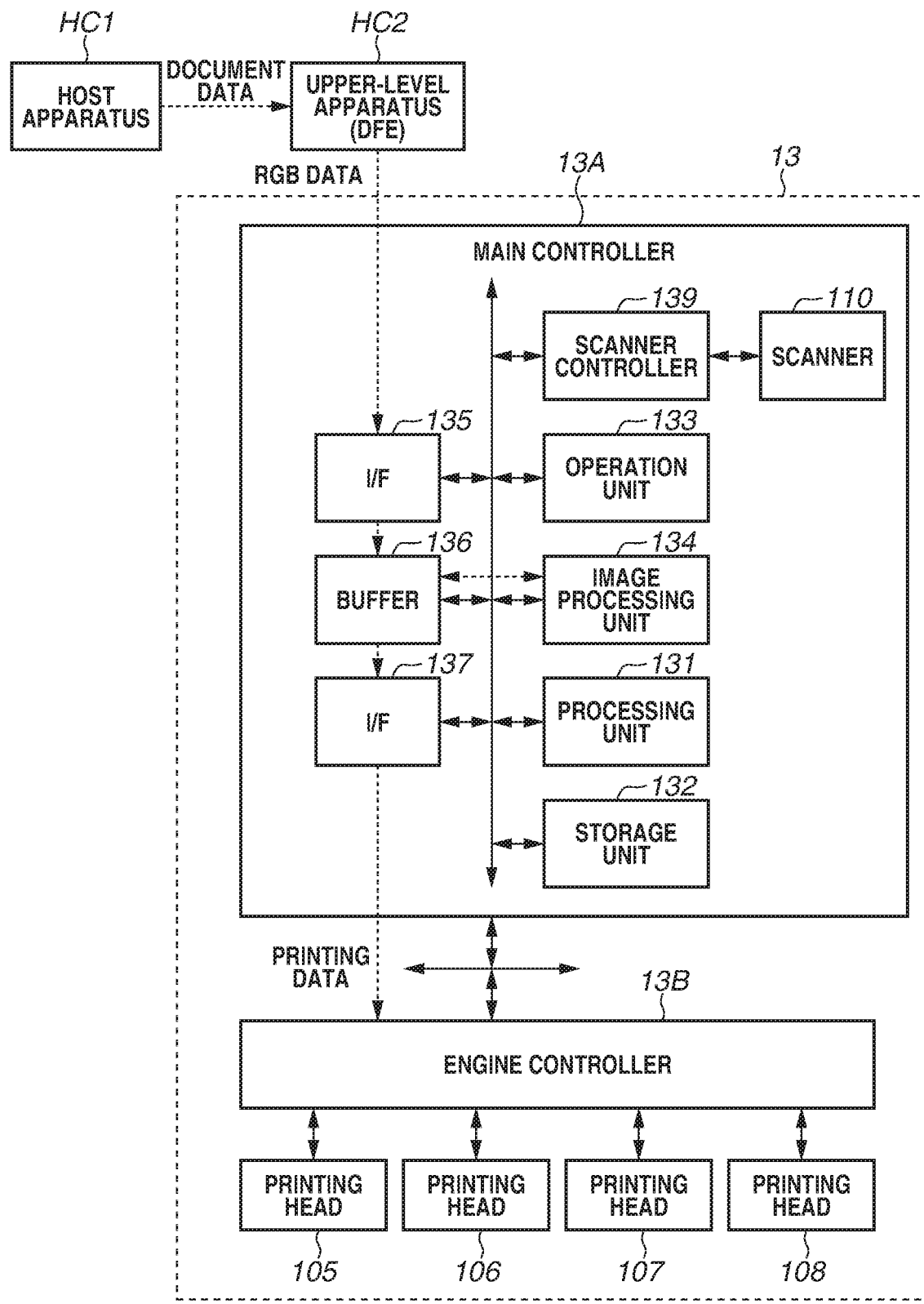
FIG. 3 is a block diagram illustrating a printing control system according to the exemplary embodiments.

FIG. 3 is a block diagram illustrating a printing control system 13 according to the present exemplary embodiment.

The printing control system 13 in the printing apparatus is communicably connected to an upper-level apparatus (Digital Front End (DFE)) HC2. The upper-level apparatus (DFE) HC2 is communicably connected to a host apparatus HC1.

The host apparatus HC1 generates and stores document data that is used to print an image. The document data is generated in an electronic file format such as a document file format and an image file format. The host apparatus HC1 transmits the document data to the upper-level apparatus HC2. The upper-level apparatus HC2 converts the received document data into a data format that can be used by the printing control system 13, i.e., an image data format in which an image is expressed in red, green, and blue (RGB). The upper-level apparatus HC2 transmits the converted data to the printing control system 13 in the printing apparatus. Alternatively, the host apparatus HC1 can convert the document data into the data format (e.g., RGB format) that can be used by the printing control system 13 and transmit the converted data to the main controller 13A.

The printing control system 13 is largely divided into the main controller 13A and an engine controller 13B. The main controller 13A includes a processing unit 131, a storage unit 132, an operation unit 133, an image processing unit 134, a communication interface (I/F) 135, a buffer 136, and a communication I/F 137.

The processing unit 131 is a processor such as a central processing unit (CPU). The processing unit 131 executes a program stored in the storage unit 132 and comprehensively controls the main controller 13A. The storage unit 132 is a storage device including a random access memory (RAM), a read-only memory (ROM), a hard disk, a solid state drive (SSD), etc. The storage unit 132 holds a program and data to be executed by the processing unit 131 and provides a work area for the processing unit 131. In the descriptions below, the storage unit 132 includes a RAM and a ROM. The operation unit 133 is an input device such as a touch panel, a keyboard, and a mouse and receives a user instruction.

The image processing unit 134 is an electronic circuit that includes, for example, an image processing processor. The buffer 136 is a RAM, a hard disk, or an SSD, for example. The communication I/F 135 communicates with the upper-level apparatus HC2, and the communication I/F 137 communicates with the engine controller 13B. Dashed arrows in FIG. 3 illustrate a flow of the processing of the data input to the printing control system 13. The image data received from the upper-level apparatus HC2 via the communication I/F 135 is accumulated in the buffer 136. The image processing unit 134 reads the data from the buffer 136, generates binary data to be used by a print engine by performing predetermined image processing on the read data, and stores the binary data in the buffer 136.

Next, the binary data, which has been obtained by the image processing and which has been stored in the buffer 136, is transmitted to the engine controller 13B via the communication I/F 137. Then, the engine controller 13B transmits a signal based on the binary data to each of the printing heads 105 to 108. Consequently, the printing elements of each of the printing heads 105 to 108 are driven, and the printing operation is performed.

While FIG. 3 illustrates a mode in which the main controller 13A includes one processing unit 131, one storage unit 132, one image processing unit 134, and one buffer 136, the main controller 13A may include a plurality of processing units 131, a plurality of storage units 132, a plurality of image processing units 134, and a plurality of buffers 136.
(Image Processing (when Image Processing Resolution Matches Printing Resolution))

FIGS. 4A and 4B are flowcharts illustrating data processing performed by the image processing unit 134 according to the present exemplary embodiment.

If a resolution (image processing resolution) of the acquired image data matches a printing resolution, the image processing unit 134 performs the flowchart in FIG. 4A.

When the image processing is started, first, in step S401, the image processing unit 134 acquires image data (input image data), which is RGB data read from the buffer 136. In the present exemplary embodiment, in the image data, each of the RGB values is constituted of 8-bit information. In the present exemplary embodiment, the image data has a data resolution of 1,200 dots per inch (dpi)×1,200 dpi. In the image data, each pixel having the data resolution of 1,200 dpi×1,200 dpi indicates one of the 256 values from 0 to 255.

In step S402, the image processing unit 134 acquires information that identifies an element that cannot form dots properly on the printing medium. More specifically, a state where the element cannot form dots properly means a state where desired dots are not formed at appropriate designed positions by using the element. Examples of such state include a state of defective ink discharge where a discharge port is clogged and ink is not discharged, or even if ink is discharged, ink droplets are deviated and do not attach to the desired positions, and a state where a printing element malfunctions and does not provide a function to print dots. The descriptions below will be made by using the defective ink discharge as an example, and acquisition of identification information for identifying a discharge port that is unable to discharge ink properly (hereinafter, defective discharge port) will be described.

To identify such a defective discharge port, any one of the following methods may be used. For example, in one method, a test patch is printed by causing all the discharge ports of a single printing head to discharge ink onto a sheet. In this method, a position where there is an image lack in the test patch is recognized by an optical sensor or is visually recognized by the user. A discharge port (or a printing element) corresponding to the position of the image lack in the test patch can be identified as a defective discharge port (or a defective printing element or a faulty element). In a case where the user visually recognizes the image lack, the user enters information about the position of the recognized image lack into the printing control system 13 via a user interface (UI) of the host apparatus HC1 or the printing control system 13. The storage unit 132 stores the information as the identification information.

For example, it is possible to use an apparatus that optically detects discharged ink while causing all the discharge ports of a single printing head to discharge ink. More specifically, the apparatus detects defective discharge by optically scanning ink that has just been discharged. In this method, an optical scanning unit including a light emitting unit and a light receiving unit is used. This apparatus causes the optical scanning unit to perform a scanning operation in such a manner that an optical axis formed between the light emitting unit and the light receiving unit passes through an ejection path of the discharged ink. If ink is discharged, the light from the light emitting unit is blocked, and an amount of the light received by the light receiving unit decreases. On the basis of this principle, the apparatus detects the defective discharge.

For example, a defective discharge port can also be detected by arranging a temperature sensor immediately under each of the electrothermal conversion elements (on an opposite side of the discharge port) and detecting a change in the temperature near the electrothermal conversion elements. If ink is discharged, new ink is supplied, and the temperature drops. On the other hand, if ink is not discharged properly, new ink is not supplied properly, and the temperature does not drop easily. Thus, defective discharge can be detected on the basis of a difference between the temperature changes. Since this method enables detection of a defective discharge port within a short time, this method is suitable in reducing the print-related time.

The identification information that indicates a defective discharge port identified as described above is stored in the storage unit 132, and in step S402, the image processing unit 134 reads the identification information therefrom. Hereinafter, the identification information is referred to as defective discharge port information. More specifically, the identification information is 1-bit information that indicates defective discharge of each of the cyan discharge ports seg0 to seg11 as illustrated in FIG. 5A. An address corresponding to information "0" or "1" is associated with each of the discharge ports. In the present exemplary embodiment, the cyan discharge port seg5 indicates defective discharge, and the value "1" is stored as the defective discharge port information. The value "0" represents normal discharge. The defective discharge port information held by the storage unit 132 correspond to the number of ink colors. Since the present exemplary embodiment uses four colors of cyan, magenta, yellow, and black (CMYK), the storage unit 132 holds the defective discharge port information corresponding to the four colors.

In a case where a plurality of discharge ports 30-1 and 30-2 is allocated to a single pixel as illustrated in FIG. 2B, the value of the defective discharge port information about the single pixel is represented by information of 2 or more bits that indicates a combination of a discharge state and a discharge position or that indicates a state of a plurality of nozzles included in the seg.

Next, in step S403, the image processing unit 134 generates defective discharge attributes. Based on the above-described defective discharge port information, defective discharge attribute information is associated with image data for each of the pixels corresponding to the discharge port and arranged in the Y-direction (see FIG. 5C). The attribute information will be used in density conversion processing described below.

Next, in step S404, the image processing unit 134 performs color conversion processing for converting the image data into ink color data (CMYK data) corresponding to individual ink amounts to be used for printing on the printing medium. In the present exemplary embodiment, while data of four colors of CMYK is described, data of a different number of ink colors is also applicable. Through this color conversion processing, the ink color data in which each of CMYK values is constituted of 8-bit information is generated from the original image data in which each of the input RGB values is constituted of 8-bit information. In the ink color data, each pixel having a data resolution of 1,200 dpi×1,200 dpi indicates one of the 256 values from 0 to 255. In the color conversion processing, a method using a three-dimensional look-up table or an arithmetic expression is used. The image processing unit 134 performs the color conversion processing by using the information previously stored in the ROM of the storage unit 132.

Next, in step S405, the image processing unit 134 performs density conversion processing on the ink color data generated in step S404 to adjust the individual ink amounts applied to the printing medium. This processing is one-dimensional output gamma processing, and data converted from the input data for one color is output. This parameter defines a value of the output data relative to a value of the input data. As the parameter, a one-dimensional look-up table as illustrated in FIG. 8C is used. Data in this look-up table is previously held in the ROM of the storage unit 132. The image processing unit 134 reads the data therefrom and performs the output gamma processing on the data for each pixel. More specifically, as illustrated in FIGS. 9A and 9B, for each settable resolution, a table is prepared for each of the colors and for each medium (printing medium) type. In the present exemplary embodiment, the parameter is switched depending on the defective discharge attributes. The switching will be described below.

(Output Gamma Processing)

Figure 8A:
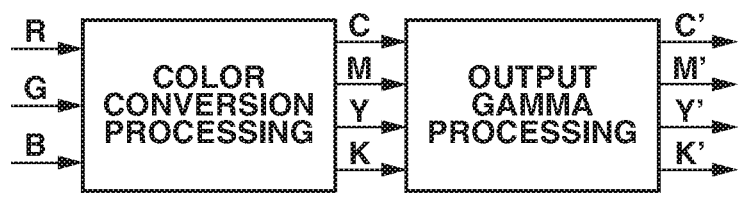
FIGS. 8A to 8C are diagrams illustrating a process of color conversion processing according to the exemplary embodiments.

FIG. 8A illustrates a concept of the output gamma processing according to the present exemplary embodiment. After performing the color conversion processing on the RGB data to obtain the ink color data of CMYK, the image processing unit 134 performs the output gamma processing thereon, and outputs the converted ink color data of CMYK.

The output gamma processing will be described in more detail with reference to FIGS. 10A to 10D. In the present exemplary embodiment, a case is described where the cyan discharge port seg5 is a defective discharge port. For the pixels whose defective discharge attribute information is "0" (white areas in FIG. 10C), the image processing unit 134 uses normal output gamma (dashed line in FIG. 10A) as a parameter in the output gamma processing. On the other hand, for the pixels whose defective discharge attribute information is "1" (shaded areas in FIG. 10C), the image processing unit 134 uses boosted output gamma (solid line in FIG. 10A) instead of the normal output gamma in the output gamma processing. If the discharge port seg5 is normal, the image processing unit 134 uses the normal output gamma for the pixels corresponding to the discharge port seg5. However, if the discharge port seg5 is in a defective discharge state, the values of the ink color data are increased, i.e., the image processing unit 134 uses output gamma that makes a correction for increasing the corresponding ink amounts to be applied to the printing medium.

Figure 10A:
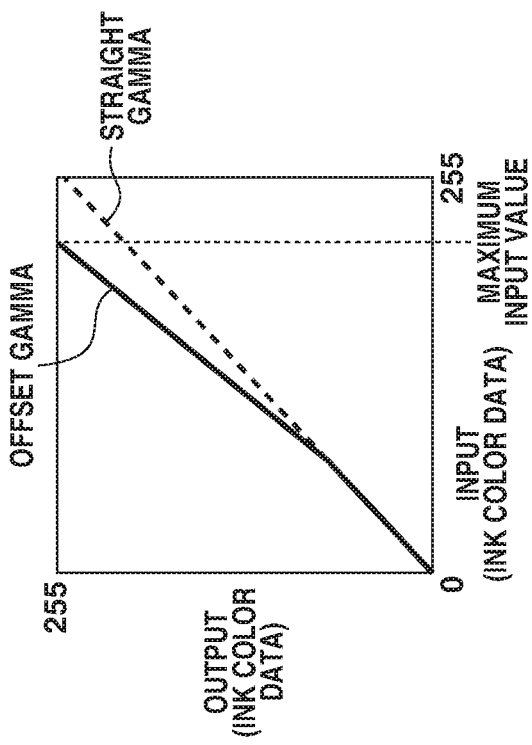
FIGS. 10A to 10D are diagrams illustrating switching of output gamma according to the exemplary embodiments.

The boosted output gamma in FIG. 10A is similar to the normal output gamma on the low density side (low gradation side) of printing density. In this one-dimensional look-up table, on the high density side (high graduation side) over the lower ⅓ of the input range, the boosted output gamma represents greater values of the ink color data than those of the normal output gamma.

Figure 8B:
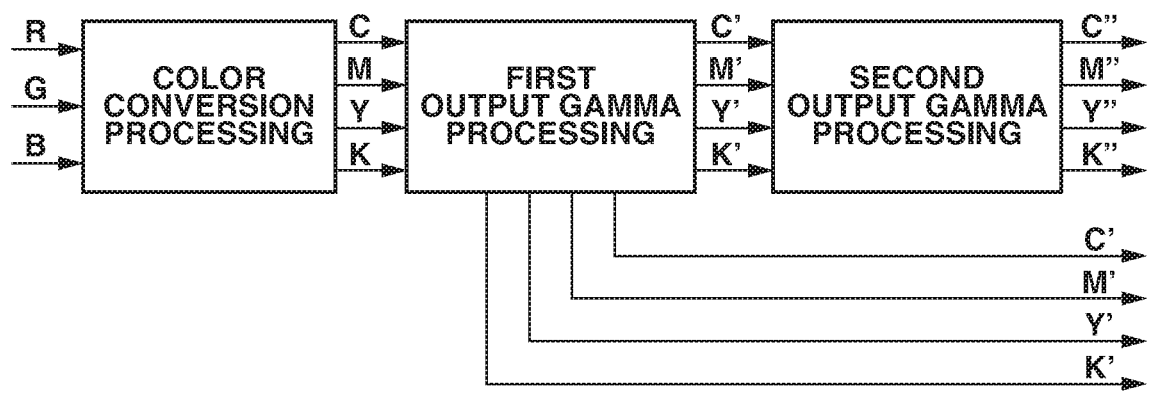
Figure 8C:
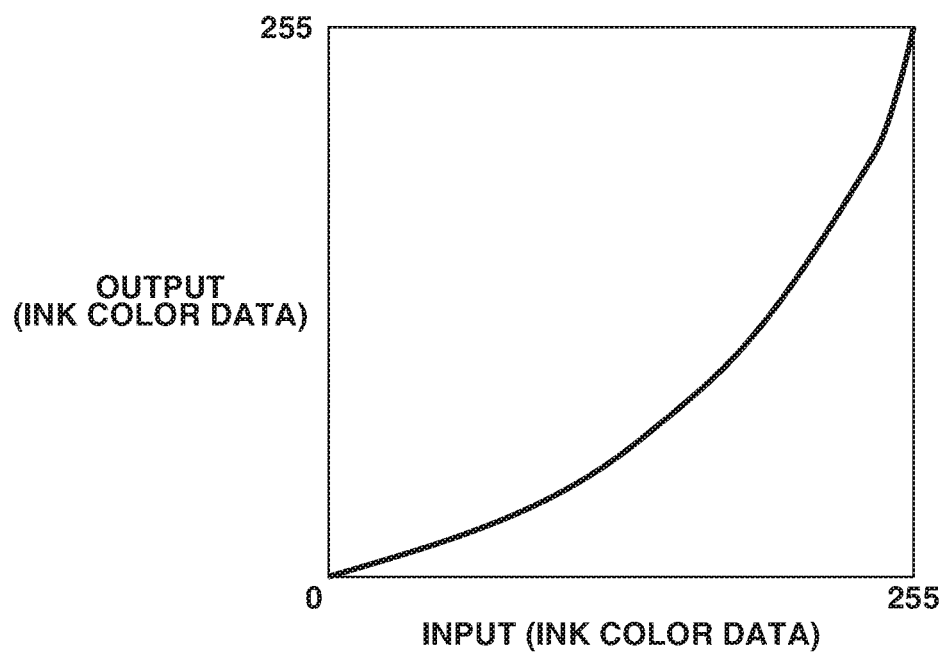
Figure 10B:
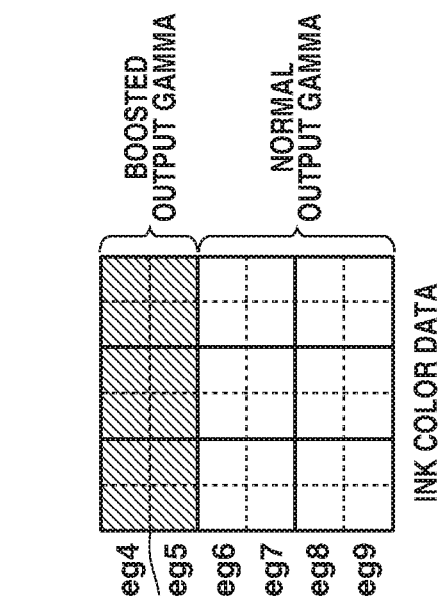
Figure 10C:
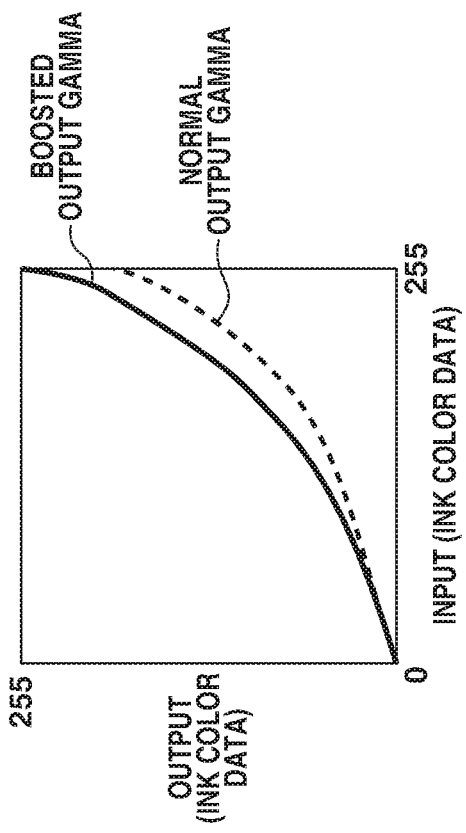
Figure 10D:
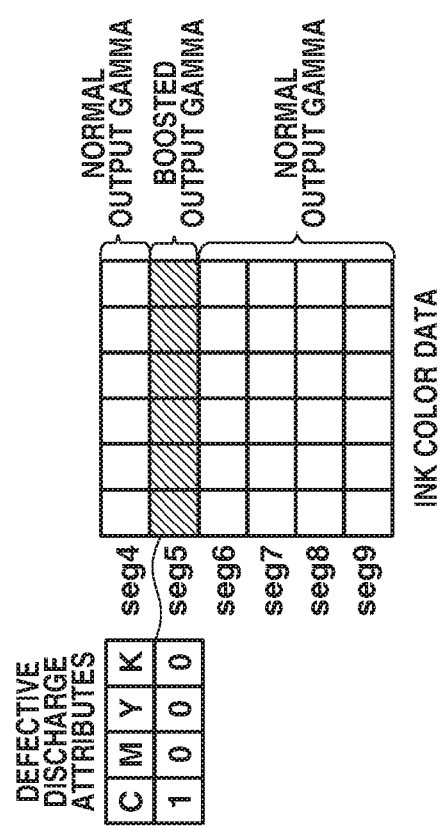

As another mode different from the above mode, as illustrated in FIG. 8B, the output gamma processing may be divided into first output gamma processing and second output gamma processing. In this mode, after performing the color conversion processing, first, the image processing unit 134 performs the first output gamma processing by applying the normal output gamma (dashed line in FIG. 10A) to all the processing target pixels. Next, in the second output gamma processing, the image processing unit 134 performs density conversion on the data for the normal discharge ports (elements) by applying straight gamma (dashed line in FIG. 10B) thereto and on the data for the defective discharge port (faulty element) by applying offset gamma (solid line in FIG. 10B) thereto. The input data and the output data are the same values in the case where the straight gamma is applied. However, in the case where the offset gamma is applied, while the output data is similar to that of the straight gamma on the low gradation side, as the gradation increases from the intermediate gradation to the high gradation, the values of the output data are increased compared with those of the straight gamma. In the present exemplary embodiment, as illustrated in FIG. 10B, the maximum input value of the offset gamma is set to a value less than 255. This is because, to avoid ink from blurring on the printing medium, a value at which ink reaches a saturation state on the printing medium is set as the maximum input value in a case where a normal discharge port discharges ink (i.e., straight gamma is applied). If there is a defective discharge port, ink is not discharged from the defective discharge port. Thus, even if the maximum input value is input to the pixels corresponding to the defective discharge port and a discharge port therearound, ink does not reach the saturation state on the printing medium. Thus, by applying the offset gamma to the data for the defective discharge port to increase the output value so as to be higher than normal, a complementary effect can be obtained. In the present exemplary embodiment, the offset gamma output value for the maximum input value is 255. Thus, even in a region near the maximum gradation, as the gradation becomes higher, the output value becomes higher compared with the value of the straight gamma.

As illustrated in FIG. 8B, after the first output gamma processing, the image processing unit 134 may output the data for the pixels to be printed by the normal discharge port directly to quantization processing in a subsequent stage without outputting the data to the second output gamma processing. In this way, the data processing for the normal discharge ports can be simplified.

Next, in step S406, the image processing unit 134 generates dot data that indicates whether to form dots by performing the quantization processing on the output ink color data. The dot data is gradation data in which each of the CMYK values is constituted of 1-bit information. As the quantization processing, a dither method, an error diffusion method, or the like may be performed. In this processing, the ink color data is compared with a threshold for each pixel, and a gradation level number is decreased. For example, in a case of binarization, if a value of the ink color data is greater than or equal to the threshold, 1 is output. If the value of the ink color data is less than the threshold, 0 is output. In the present exemplary embodiment, through the quantization processing, the image processing unit 134 generates dot data having a data resolution of 1,200 dpi×1,200 dpi. The dot data indicates either of two values of level 0 and 1 (two gradation value levels) for each pixel having a data resolution of 1,200 dpi×1,200 dpi. Level 0 indicates OFF of dot formation, i.e., no dots are formed. Level 1 indicates ON of the dot formation, i.e., dots are formed. More specifically, the binary data indicates either forming or not forming dots, i.e., either discharging or not discharging ink, for each pixel to be printed with the resolution of 1,200 dpi (X direction)× 1,200 dpi (Y direction) on the printing medium.

As another mode, a size of an ink droplet discharged from one discharge port in a single discharge operation may be changed. The dot data in this case can be represented by three or more levels. For example, if an ink amount is represented by three levels of "large", "medium", and "small", the corresponding dot data can be represented by four values of 0 to 3. In this case, level 3 indicates a large amount of ink, level 2 indicates a medium amount of ink, level 1 indicates a small amount of ink, and level 0 indicates OFF of the dot formation. For example, the size of the ink droplet can be changed by using a piezoelectric element and by controlling a voltage to be applied based on the corresponding dot data.

In the present exemplary embodiment, the parameter used in the quantization processing performed on the data for the pixels to be printed by using the discharge port seg5, which is the defective discharge port, is the same as that used in the quantization processing performed on the data for the pixels to be printed by using the other normal discharge port.

The boosted gamma or the offset gamma is applied to the pixel on which a dot does not appear since the value of the ink color data is less than a quantization threshold when the normal gamma is applied. In this way, the value of the ink color data exceeds the threshold, and ON of the dot formation (hereinafter simply referred to as ON) is applied to the corresponding pixel, whereby a dot can be newly printed. The value of the ink color data corresponding to the newly printed ON pixel is at a level that can be increased to exceed the threshold by an increase of the value and is originally near the threshold. Thus, in terms of image gradation, a quantization result in a case where the discharge port is defective is not greatly different from a quantization result obtained in a case where the discharge port is normal. Thus, it is possible to increase the number of dots in the dot data for the defective discharge port so that the resultant number of dots is close to the number of dots obtained by using the normal discharge port.

Next, in step S407, the image processing unit 134 performs complementary processing for complementing the defective discharge of the defective discharge port and generates complementary data. FIGS. 11A and 11B illustrate processing of generating complementary-processed data from the ink color data. In the complementary processing, if the defective discharge attribute information indicates defective discharge for a pixel, and pixel data thereof indicates dot formation ON, the pixel data is shifted to a neighboring pixel in the Y direction. FIG. 11A illustrates processing performed in a case where density of the ink color data for the defective discharge port seg5 (shaded areas in FIG. 11A) is converted, in the same way as the ink color data for the other normal discharge port, by using the normal output gamma in the previous density conversion processing. In this example, all the values in the ink color data for the individual pixels within a range indicated by the Y direction (seg4 to seg9)×X direction (columns a to f) are 128. In the binary data generated through the quantization processing based on the ink color data, 18 pixels out of the 36 pixels represent ON. There is variation in dot positions between segs due to a quantization parameter such as a dither threshold and an error diffusion coefficient. More specifically, the variation is made since the binary data is generated so as to express pseudo halftone. From among the ON pixels of the binary data (black areas of binary data (before complementary processing) in FIG. 11A), the pixel data corresponding to the discharge port seg5 of defective discharge is shifted to pixels corresponding to a neighboring discharge port. The shifted binary data is illustrated in binary data (after complementary processing) in FIG. 11A. In the present exemplary embodiment, it is previously determined that the pixel data corresponding to the defective discharge port seg5 be shifted to the data corresponding to the discharge port seg6, which neighbors the discharge port seg5 in the same column (same position in the X direction). The method for generating data used in the complementary processing is not particularly limited. Herein, first, the binary data for the pixels to be printed by the defective discharge port is copied to the RAM of the storage unit 132 or a register in the image processing unit 134. Next, the copied data is added to the binary data of the complementary pixels (destinations to which the dot data is shifted) by performing an OR operation or the like, whereby the data of the complementary pixels can be obtained. The data of the pixels to be printed by the defective discharge port may be updated to indicate dot formation OFF or may be left unchanged.

Among the data of the pixels in the column d in the binary data in FIG. 11A, while the data for the pixel corresponding to the discharge port seg5 is ON, the data for the pixel corresponding to the discharge seg6 is OFF. Thus, in the column d, to complement the dot that is not formed on the pixel corresponding to the discharge port seg5, a dot can be formed on the pixel corresponding to the discharge port seg6. On the other hand, the data for the pixels corresponding to the discharge ports seg5 and seg6 in the columns b and f is ON. In this case, no further ON data can be added to the pixels corresponding to the discharge port seg6. Since the complementary pixels are already ON, due to the defective discharge of the defective discharge port seg5, dots corresponding to two pixels are lost from the dots that are to be formed by the original data.

Next, with reference to FIG. 11B, there is described processing from the density conversion processing to generation of the binary data after complementary processing according to the present exemplary embodiment. A mode described with reference to FIG. 11B differs from the mode described with reference to FIG. 11A in that processing using the boosted output gamma has been performed on the ink color data corresponding to the discharge port seg5 (shaded areas in FIG. 11A) in the density conversion processing in step S405 on the basis of the defective discharge attribute information. The other processing is similar to that described with reference to FIG. 11A.

In the present exemplary embodiment, due to an effect of the boosted output gamma, the values of the data are higher than those described with reference to FIG. 11A. Thus, the pixels corresponding to the discharge port seg5 are ON in all the columns in the binary data after the quantization processing. In this way, by increasing the number of ON pixels corresponding to the discharge port seg5, compared with the number of ON pixels in a case where the discharge port seg5 does not indicate defective discharge, the number of ON pixels is increased. Since the data for the pixels corresponding to the discharge port seg6 is ON in columns b, c, and f, these pixels cannot be used to complement the pixels corresponding to the discharge port seg5. However, since the data for the pixels corresponding to the discharge port seg6 is not ON in columns a, d, and e, the ON data for the pixels corresponding to the discharge port seg5 can be added to the discharge port seg6. Compared with the mode described with reference to FIG. 11A, ON data for three pixels has additionally been generated for the data corresponding to the discharge port seg5, and two out of the three pixels can be complemented by the discharge port seg6. Thus, in the present exemplary embodiment, the number of dots that can be printed is increased by two. In this way, in the data corresponding to the discharge port that indicates defective discharge, the number of dots to be printed is increased compared to a case where the discharge port does not indicate defective discharge. As a result, the number of dots to be complemented is increased compared with the case where the normal gamma is used, and a probability that more dots are printed for complementary purposes on the printing medium can be increased compared with the case where the normal gamma is used. Depending on a dot arrangement, the effect of the boosted gamma can cause a neighboring discharge port to complement a greater number of dots than the number of dots that originally is to be printed by the discharge port that indicates defective discharge. However, it is expected that this can further improve an effect of compensating a lack of dots on the pixels corresponding to the defective discharge port. Meanwhile, the output value of the boosted output gamma is to be appropriately set so that the dots are not excessively formed.

Figure 12A:
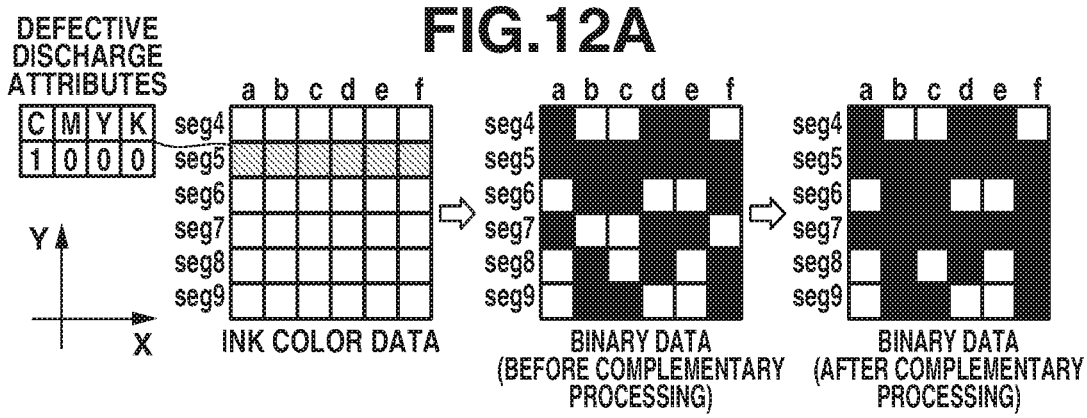
FIGS. 12A to 12D are diagrams illustrating complementary processing according to the exemplary embodiments.
Figure 12B:
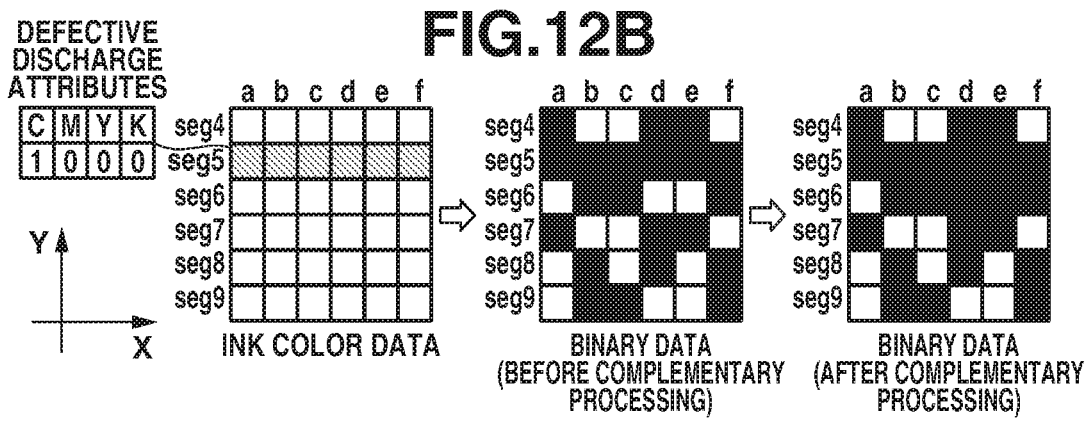
Figure 12C:
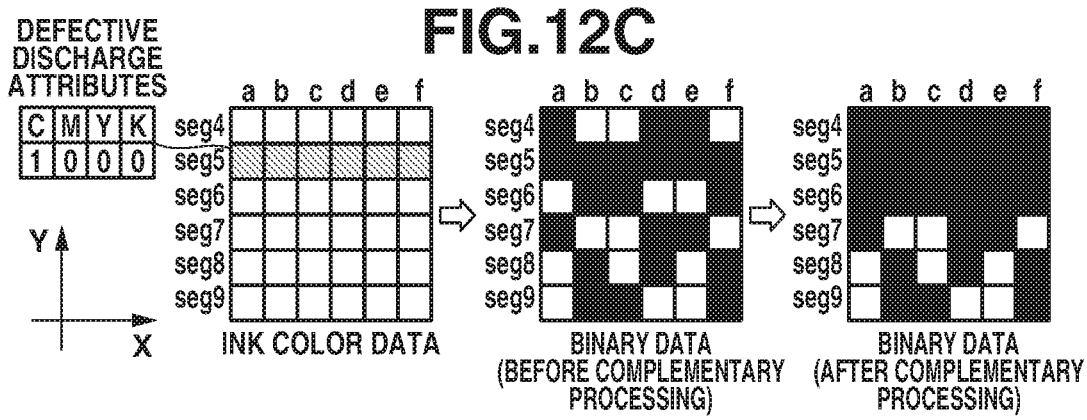

In the complementary processing, the data for the pixels corresponding to the defective discharge port (seg5 in the present exemplary embodiment) may be shifted to data for pixels corresponding to a discharge port different from the neighboring discharge port. In the example in FIG. 12A, dot-ON pixels are shifted to pixels corresponding to the discharge port seg7, which is two discharge ports away from the discharge port seg5 in the Y direction. In the example in FIG. 12B, a dot-ON pixel is shifted to a pixel positioned one pixel down in the Y direction and one pixel right in the X direction (diagonally bottom right pixel in FIG. 12B). In the example in FIG. 12C, a dot-ON pixel is shifted to a dot-OFF pixel among predetermined complementary pixels (pixels corresponding to the discharge ports seg4 and seg6 and belonging to the same column in the X direction). In this case, the destination to which the dot-ON pixel is shifted is determined by analyzing the binary data and by identifying a pixel that is not ON. If both of the pixels corresponding to the discharge ports seg4 and seg6 in the same column are ON, the dot-ON pixel cannot be shifted to any pixel in this column. However, according to the present exemplary embodiment, if a dot can be printed on a dot-OFF pixel of one of the neighboring discharge ports seg4 and seg6 in another column, the number of dots to be printed is not reduced.

Figure 12D:
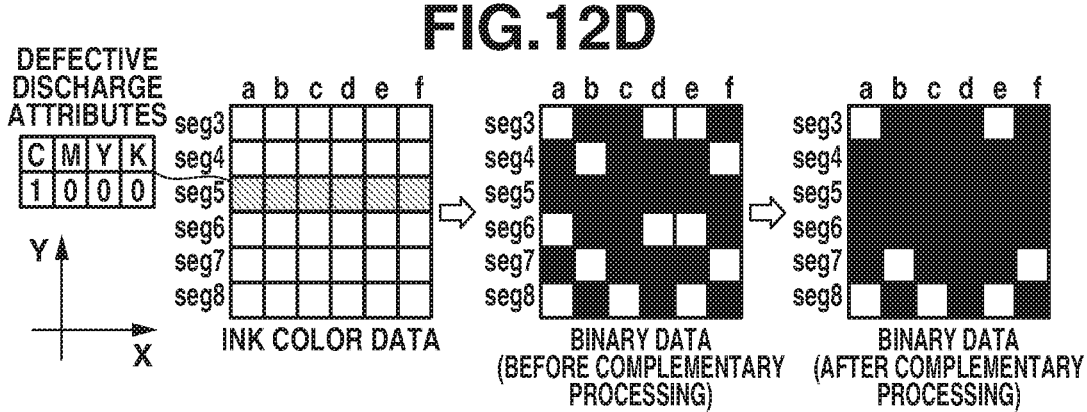

In the example in FIG. 12D, a dot-ON pixel is shifted to a dot-OFF pixel among the pixels in a range up to two pixels away positively and negatively in the X direction and corresponding to the discharge ports up to two discharge ports away positively and negatively in the Y direction from the dot-ON pixel. For example, the dot-ON pixel corresponding to the discharge port seg5 in the column c can be shifted to one of the pixels that correspond to one of the discharge ports seg3, seg4, seg6, and seg7 and that are positioned in one of the columns a to e. In FIG. 12D, since the pixels corresponding to the discharge ports seg3 to seg7 in column c are dot-ON pixels in the binary data before the complementary processing, the dot-ON pixel corresponding to the discharge port seg5 in column c cannot be shifted to any pixel in the same column. Thus, the dot-ON pixel is shifted to the dot-OFF pixel corresponding to the discharge port seg3 in the column d, which neighbors the column c in the X direction.

In the above processing, complementary pixels for the pixels corresponding to the discharge port seg5 are determined in the order of the pixels in the X direction from the column a to the column e. If a dot-OFF pixel is changed to a dot-ON pixel to serve as a complementary pixel for a previously processed pixel, this dot-ON pixel cannot be used as a complementary pixel for another pixel.

In the complementary processing, the data for the pixels corresponding to the defective discharge port does not necessarily have to be shifted to the pixels in the range up to two pixels away in the X direction and two pixels away in the Y direction. The range in which a complementary pixel is selected varies depending on how the number of dots is increased by the boosted gamma or the offset gamma or depending on the number of neighboring dot-ON pixels. However, according to the present exemplary embodiment, a complementary pixel is to be selected from the pixels positioned no further than $\frac{1}{400}$ inches from the position of the original dot position. In this way, a lack of dots is not easily recognized visually. In addition, from the same point of view, in the case of a discharge port for 1,200 dpi, the data for the defective discharge port is to be shifted to data for a discharge port in a range up to three discharge ports away from the defective discharge port (within $\frac{1}{400}$ inches from the defective discharge port).

In addition, for example, in a case where a large amount of ink is discharged and a dot diameter is large or in a case where an amount of bleeding of ink is large after landing on the printing medium, the complementary effect can also be expected by using a discharge port that is three or more discharge ports away from the defective discharge port (interposing two discharge ports). In this case, a discharge port that is three or more discharge ports away from the defective discharge port can be used as the destination to which the pixel is shifted.

After the complementary processing in step S407, the main controller 13A transmits the binary data to the engine controller 13B after the complementary processing. The engine controller 13B transmits a signal for driving each of the printing heads of the individual colors to each of the printing heads 105 to 108 based on the binary data. As a result, the printing elements of each of the printing heads 105 to 108 are driven, and the printing operation is performed.

In the present exemplary embodiment, a look-up table is used. In this look-up table, a boosting effect starts to appear when density of the image indicated by the input data becomes relatively high. In addition, as the density increases more and more, a difference between the normal output gamma and the boosted output gamma becomes larger. In a case of an image having a low density, the binary data includes a small number of ON pixels, and it is expected that a pixel near the pixels corresponding to the defective discharge port can be used as the complementary pixel. In addition, by adjusting the quantization processing, the data for the pixel used as the complementary pixel can be set to OFF. Under this premise, in a case where the image having the low density is printed, dots are not to be excessively formed. More specifically, a gamma is desirable in which the number of the ink color data is not increased on the low density side and a value of the ink color data is increased on the intermediate to high density side. However, even if an image having the low density is printed, in the pseudo halftone processing using the quantization processing, it is difficult to perfectly control the dot arrangement. The candidate pixel to which data for complementary purposes is to be shifted may already be set to ON. In this case, the value of the low-gradation ink color data can be increased. These methods can be selectively used as appropriate.

In a second exemplary embodiment, a case in which the image processing resolution and the printing resolution are different will be described. In the present exemplary embodiment, a case in which the image processing resolution is 600 dpi and the printing resolution is 1,200 dpi will be described. The present exemplary embodiment will be described with reference to a flowchart in FIG. 4B and other drawings.

As in the first exemplary embodiment, when the image processing is started, first, in step S411, the image processing unit 134 acquires image data (RGB data) read from the buffer 136. In the present exemplary embodiment, in the image data, each of the RGB values is constituted of 8-bit information. In the present exemplary embodiment, the image data has a data resolution of 600 dpi×600 dpi. In the image data, each pixel having the data resolution of 600 dpi×600 dpi indicates one of the 256 values from 0 to 255.

Next, in step S412, the image processing unit 134 reads information indicating a defective discharge port from the storage unit 132.

Next, in step S413, the image processing unit 134 generates defective discharge port attributes. While the image processing resolution is 600 dpi, the discharge ports are arranged at intervals of ¹⁄₁,₂₀₀ inches. Thus, two discharge ports correspond to data of one pixel. FIG. 6B illustrates a correspondence relationship between pixels and discharge ports. An individual pixel is surrounded by a solid line, and, for example, one pixel is printed by the discharge ports seg0 and seg1. On the basis of the above-described defective discharge port information, the defective discharge attribute information is associated with image data of each of the pixels in the Y direction corresponding to the discharge ports. Since the cyan discharge port seg5 in FIG. 6A indicates defective discharge, the image data of the pixels corresponding to the discharge port seg5, i.e., the image data of the pixels corresponding to the discharge ports seg4 and seg5, is associated with the defective discharge attribute information (see FIG. 6B). The attribute information will be used in the density conversion processing described below.

Next, in step S414, the image processing unit 134 performs color conversion processing. Ink color data in which each of the CMYK values is constituted of 8-bit information is generated from the original image data in which each of the input RGB values is constituted of 8-bit information. In the ink color data, each pixel having a data resolution of 600 dpi×600 dpi indicates one of the 256 values from 0 to 255. In the color conversion processing, for example, a method using a three-dimensional look-up table or an arithmetic expression is used. The image processing unit 134 performs the color conversion processing by using the information previously stored in the ROM of the storage unit 132.

Next, in step S415, the image processing unit 134 performs density conversion processing. The image processing unit 134 performs output gamma processing on the ink color data generated in step S414 to adjust each of ink amounts applied to the printing medium. The image processing unit 134 outputs data converted from the input data for each color through one-dimensional density conversion processing in the output gamma processing. The image processing unit 134 switches the parameter used in the output gamma processing on the basis of the defective discharge attribute information. The switching is performed in the same way as in the first exemplary embodiment i.e., the image processing unit 134 performs the conversion in such a manner that the gradation values of the pixels corresponding to the defective discharge port are increased. The pixels corresponding to the switching are pixels 61 to 63 corresponding to the discharge port seg5 indicating defective discharge.

Next, in step S416, the image processing unit 134 performs quantization processing on the ink color data to generate gradation data in which each of the CMYK values is constituted of 3-bit information. As the quantization processing, a dither method, an error diffusion method, or the like may be performed. In the present exemplary embodiment, gradation data having a data resolution of 600 dpi×600 dpi is generated by the quantization processing. In the gradation data, each pixel having the data resolution of 600 dpi×600 dpi indicates one of the five values from a level 0 to a level 4 (five gradation values).

Next, in step S417, the image processing unit 134 performs index rasterization processing on the gradation data to generate binary gradation data in which each of the CMYK values is constituted of 1-bit information with a resolution rank of 1,200×1,200 dpi.

In the present exemplary embodiment, the image processing unit 134 uses index patterns A to D as illustrated at the bottom portion in FIGS. 14A to 14D. The storage unit 132 stores the four index patterns A to D, and the image processing unit 134 selects and applies one of the four index patterns on the basis of the position of the pixel having a resolution of 600×600 dpi.

Numbers in each of the pixels in FIGS. 14A to 14D indicate thresholds that are compared with the gradation values of the gradation data to determine whether to discharge ink or not. More specifically, if the gradation value is greater than or equal to the threshold in the pixel, the image processing unit 134 determines that ink is discharged to the corresponding pixel. Otherwise, the image processing unit 134 determines that ink is not discharged to the corresponding pixel.

Figures 14A, 14B, 14C, 14D:
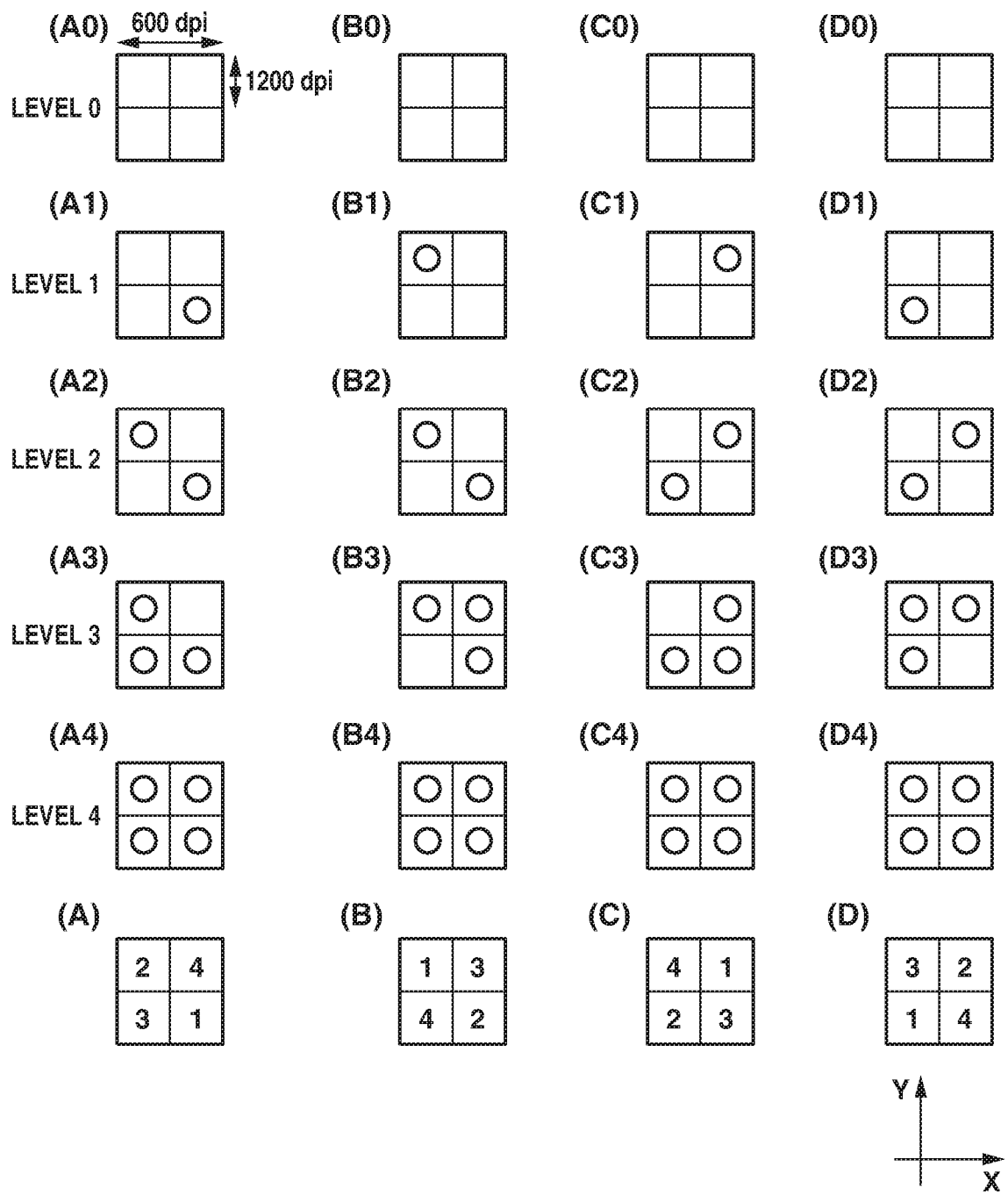
FIGS. 14A to 14D are diagrams illustrating index patterns according to the exemplary embodiments.

For example, in a case of the index pattern A in FIG. 14A, the threshold "1" is set the bottom-right pixel, the threshold "2" is set to the top-left pixel, "3" is set to the bottom-left pixel, and "4" is set the top-right pixel.

Thus, in a case where gradation data is input in which the gradation value of the pixel group indicates the level 0, the gradation value of each of the pixels is determined to be 0, which will be compared with the thresholds. As a result, the image processing unit 134 determines that ink is discharged to none of the 2×2 pixels in the pixel group ((A0) in FIG. 14A). In a case where the gradation data is input in which the gradation value indicates the level 1, the image processing unit 134 determines that ink is discharged only to the bottom-right pixel set to the threshold "1" ((A1) in FIG. 14A). In a case where the gradation data is input in which the gradation value indicates the level 2, the image processing unit 134 determines that ink is discharged to the bottom-right pixel set to the threshold "1" and to the top-left pixel set to the threshold "2" ((A2) in FIG. 14A). In a case where the gradation data is input in which the gradation value indicates the level 3, the image processing unit 134 determines that ink is discharged to the bottom-right and top-left pixels set to the respective thresholds "1" and "2" and to the bottom-left pixel set to the threshold "3" ((A3) in FIG. 14A). In a case where the gradation data is input in which the gradation value indicates the level 4, the image processing unit 134 determines that ink is discharged to all the 2×2 pixels in the pixel group ((A4) in FIG. 14A). The same applies to the index patterns illustrated in FIGS. 14B to 14D.

The binary data generated by the index rasterization processing has a printing resolution of 1,200 dpi×1,200 dpi. More specifically, in the binary data, each pixel having the printing resolution of 1,200 dpi×1,200 dpi indicates either discharge of ink or non-discharge of ink.

Herein, the same index patterns are applied to the image data to be printed by using the discharge port seg5 of defective discharge and the image data to be printed by using the other discharge ports indicating normal discharge.

In the present exemplary embodiment, as it is clear from FIGS. 14A to 14D, in any one of the index patterns A to D, the pixels indicating the thresholds "1" and "2" are arranged not to be adjacent in the Y direction within the same index pattern. These index patterns A to D can be arranged in a predetermined arrangement pattern as illustrated in FIG. 15A. If the index patterns A to D are arranged as illustrated in FIG. 15A, the thresholds are arranged as illustrated in FIG. 15C. In this arrangement, if gradation data having a gradation value indicating the threshold "2" or less is input, the pixels corresponding to ink discharge are not arranged side by side in the Y direction. FIG. 15D illustrates a case in which the gradation values of all the pixels indicate the threshold 2. FIG. 15B illustrates a complementary pixel for each pixel (determined per pixel of 1,200 dpi×1,200 dpi) by using an arrow in each pixel. If a discharge port indicates defective discharge, the dot of the corresponding pixel is shifted to a position indicated by the corresponding arrow. In this case, the dot of each of the pixels is shifted by one pixel to its adjacent position in the Y direction. With this arrangement as illustrated in FIG. 15D, when the pixels are complemented by the complementary pixels illustrated in FIG. 15B in the following complementary processing, all the dots can be complemented without fail. Use of the dot arrangement control and the complementary pixel determination method using the above index patterns is suitable in ensuring complementary pixels for the pixels having densities of low gradations (herein, the gradation value of 2 or less).

Next, in step S418, the image processing unit 134 performs complementary processing for complementing the defective discharge of the defective discharge port and generates complementary data. FIG. 13A illustrates processing for obtaining binary data after complementary processing from the ink color data indicated by the 256 values in a case where the density of the ink color data for the discharge ports seg4 and seg5 is converted by using the normal output gamma in the density conversion processing in step S415. After the binary data (after complementary processing) is generated, as in the first exemplary embodiment, the dots corresponding to the defective discharge of the discharge port seg5 are complemented by the neighboring discharge port seg6. While one pixel can be recovered by the discharge port seg6, since the complementary pixels are not available for the other two pixels, the dots corresponding to the two pixels are lost because of the defective discharge of the discharge port seg5.

FIG. 13B illustrates a case in which processing is performed by using the boosted output gamma on the ink color data corresponding to the discharge ports seg4 and seg5 in the density conversion processing according to the present exemplary embodiment. In the present exemplary embodiment, due to the effect of the boosted output gamma, values of the ink color data are higher than those in the case in FIG. 13A. Thus, the pixels corresponding to the discharge ports seg4 and seg5 represent ON in all columns in the binary data after the quantization processing. In this way, compared with the number of ON pixels in the case where the discharge port seg5 does not indicate defective discharge, there are more ON pixels corresponding to the discharge ports seg4 and seg5 in the other columns. Since the data of the pixels corresponding to the discharge port seg6 is ON in the columns b, c, and f, these pixels cannot be used to complement the pixels corresponding to the discharge port seg5. However, since the data of the pixels corresponding to the discharge port seg6 is not ON in columns a, d, and e, the ON data of the pixels corresponding to the discharge port seg5 can be added to the pixels corresponding to the discharge port seg6. When compared with the mode described with reference to FIG. 13A, ON data of extra three pixels has been added to the data corresponding to the discharge port seg5 in the present exemplary embodiment, and two out of the three pixels can be complemented and printed by the discharge port seg6. Thus, the number of dots printed can be increased by two.

After the complementary processing in step S417, the main controller 13A transmits the generated binary data after the complementary processing to the engine controller 13B. The engine controller 13B transmits a signal for driving each of the printing heads of each of the colors to the printing heads 105 to 108 based on the binary data.

A third exemplary embodiment will be described with reference to FIGS. 4B and 14A to 14D. In the present exemplary embodiment, in a case where the image processing resolution and the printing resolution are different, the number of dots is increased through the index rasterization processing in step S417. Steps S411 to S414 are the same as those in the second exemplary embodiment, and redundant descriptions thereof will be avoided.

In step S415, the image processing unit 134 performs density conversion processing. The image processing unit 134 performs output gamma processing on the ink color data generated in step S414 to adjust the individual ink amounts applied to the printing medium. The image processing unit 134 outputs data converted from the input data for each color through one-dimensional density conversion processing in the output gamma processing. The image processing unit 134 does not switch the parameter used in the output gamma processing on the basis of the defective discharge attribute information. The data for the defective discharge port and the normal discharge port is processed by using the same parameter.

Next, in step S416, similar to the second exemplary embodiment, the image processing unit 134 performs quantization processing on the ink color data to generate gradation data in which each of the CMYK values is constituted of 3-bit information. In the present exemplary embodiment, gradation data having a data resolution of 600 dpi×600 dpi is generated by the quantization processing. In the gradation data, each pixel with a data resolution of 600 dpi×600 dpi indicates one of five values from a level 0 to a level 4 (five gradation values).

Next, in step S417, the image processing unit 134 performs index rasterization processing on the gradation data to generate binary data in which each of the CMYK values is constituted of 1-bit information. Herein, as the index pattern applied to the image data to be printed by using the discharge port seg5 of defective discharge, an index pattern indicating a one level higher gradation value than the gradation value indicated by the gradation data is applied. For example, when the gradation value of the gradation data to be printed by using the discharge port seg5 is 1, the gradation value is increased by 1 to become 2. One of the index patterns (A2) to (D2) in the level 2 illustrated in FIGS. 14A to 14D is applied.

Next, in step S418, the image processing unit 134 performs complementary processing for complementing defective discharge of the defective discharge port, and generates complementary data. This complementary processing is similar to that according to the second exemplary embodiment.

In the present exemplary embodiment, in performing the index rasterization processing, the image processing unit 134 increases by one the gradation value of the image data to be printed by using the defective discharge port, whereby the index pattern that is one level higher is selected. If the index pattern can be selected without changing the gradation value, such method may also be used. If the gradation value of the image data corresponding to the defective discharge port is 0, there is no need to increase the gradation value.

A fourth exemplary embodiment will be described with reference to FIG. 4A and FIGS. 16A and 16B. In the present exemplary embodiment, processing to increase the number of dots for the pixels corresponding to the defective discharge port is performed in the quantization processing (S406 and S416). In the present exemplary embodiment, an example in which a dither method is used will be described as an example of the quantization processing. In the present exemplary embodiment, the image processing resolution is the same as the printing resolution, while similar processing is performed in a case where the image processing resolution and the printing resolution are different. Steps S401 to S404 in FIG. 4A are similar to those according to the first exemplary embodiment.

Next, in step S405, the image processing unit 134 performs density conversion processing. The image processing unit 134 does not switch the gamma used in the output gamma processing on the basis of the defective discharge attribute information. The data for the defective discharge port and the normal discharge port is processed by using the same parameter.

Next, in step S406, the image processing unit 134 performs quantization processing on the ink color data to generate gradation data in which each of the CMYK values is constituted of 1-bit information. In this quantization processing, ink color data and a threshold of a quantization threshold matrix are compared for each pixel. If the ink color data is greater than or equal to the corresponding threshold, the image processing unit 134 sets the dot formation to ON. If not, the image processing unit 134 sets the dot formation to OFF.

The image processing unit 134 performs this quantization processing by using the defective discharge attribute information generated in step S403. FIGS. 16A and 16B illustrate examples of the threshold matrix used in the quantization processing based on the dither method.

For a pixel having defective discharge attribute information indicating "0", a threshold matrix in FIG. 16A is used. On the other hand, for a pixel having defective discharge attribute information indicating "1", a threshold matrix in FIG. 16B is used. The number of ON dots is higher when the threshold matrix in FIG. 16B is used than when the threshold matrix in FIG. 16A is used. The threshold of each pixel in FIG. 16B is half the threshold of each pixel in FIG. 16A. Since the thresholds in the threshold matrix in FIG. 16B are lower than those in the threshold matrix in FIG. 16A, dots are more likely to be generated.

Next, in step S407, the image processing unit 134 performs complementary processing to generate complementary data. The complementary processing and the subsequent processing are similar to those according to the first exemplary embodiment. In the first exemplary embodiment, the ink color data is increased in the density conversion processing. However, as in the present exemplary embodiment, by lowering the thresholds based on the dither method, the number of dots in the data for the defective discharge port can be increased in the binary data as in the first exemplary embodiment. Instead of preparing a different matrix as the matrix illustrated in FIG. 16B, a value based on the gradation of ink color data may be subtracted from the corresponding threshold for the defective discharge port in the threshold matrix in FIG. 16A.

A fifth exemplary embodiment will be described with reference to FIG. 4A, FIGS. 5A and 5C, and FIGS. 17A to 17D. In the fifth exemplary embodiment, processing for increasing the number of dots is performed after binary data is generated. Hereinafter, a case in which the image processing resolution and the printing resolution are the same will be described. However, similar processing is performed even if the image processing resolution and the printing resolution are different. The following description will be provided by using the discharge port illustrated in FIG. 5A.

First, the same processing as that according to the first exemplary embodiment is performed up to the color conversion processing in step S404 in FIG. 4A.

Next, in step S405, the image processing unit 134 performs density conversion processing. The image processing unit 134 performs output gamma processing on the ink color data generated in step S404 to adjust each of the ink amounts applied to the printing medium. The image processing unit 134 outputs data converted from the input data for each color through one-dimensional density conversion processing in the output gamma processing. The image processing unit 134 does not switch the parameter used in the output gamma processing on the basis of the defective discharge attribute information. The data for the defective discharge port and the normal discharge port is processed by using the same parameter.

Figure 17A:
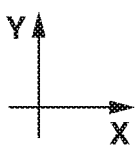
FIGS. 17A to 17D are diagrams illustrating how the number of dots is increased according to the exemplary embodiments.

FIG. 17A illustrates an example of multi-valued ink color data obtained after the density conversion processing in step S405. From among the pixels formed by using the discharge port illustrated in FIG. 5A, only 3×3 pixels (nine pixels) are illustrated. In the present exemplary embodiment, since the highest data value after the density conversion processing is 4,080, when a value of the ink color data is ⅔ or more of 4,080, i.e., 2,720 or more, for example, information indicating that the value is 2,720 or more is added to the data, and the quantization processing is performed. In the example in FIG. 17A, the top middle value, the top right value, and the bottom left value are 2,720 or more.

Figure 17B:
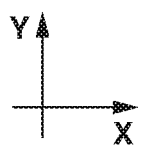
Figure 17C:
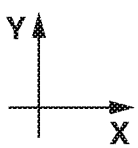

Next, in step S406, the image processing unit 134 performs quantization processing. FIG. 17B illustrates an example of a set of thresholds used in the quantization processing. FIG. 17C illustrates binary data obtained after the image processing unit 134 performs quantization processing on the ink color data illustrated in FIG. 17A by using these thresholds. With the data after the density conversion processing, ink color data having a value greater than or equal to half of the highest value is not expressed as a dot depending on the threshold used in the quantization processing. In the example in FIG. 17C, while the values of the multi-valued data in the top right and the bottom left pixels indicate 2,720 or more, the data is not expressed as dots. Regarding the image data to be formed by the discharge port that is determined to be a defective discharge port by the defective discharge port information in step S402, such data is processed so that the data will appear as dots.

Figure 17D:
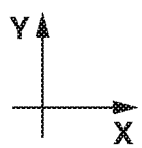

In step S405, the multi-valued data having the value of 2,070 or more can be distinguished. Thus, based on such information, after the image processing unit 134 determines whether the data having the value of 2,070 or more appears as dots, if the image processing unit 134 determines that the data does not appear as dots, the image processing unit 134 generates the dots on the corresponding position on the basis of the information. In this way, the number of dots of the image data corresponding to the defective discharge port can be increased. FIG. 17D illustrates a state in which the number of dots has been increased. In the present exemplary embodiment, since the discharge port seg5 is a defective discharge port, the image processing unit 134 generates a dot on the top right pixel, which is a pixel corresponding to the defective discharge port seg5 and is at a position in which no dot appears while the data has the value of 2,070 or more. Subsequently, in step S407, the image processing unit 134 performs the complementary processing. This processing is similar to that according to the first exemplary embodiment.

In the present exemplary embodiment, the number of dots is increased by taking the values indicating ⅔ or more of the highest value as dots. In this exemplary embodiment, the number of dots can be increased for high gradation data, i.e., for multi-valued data greater than or equal to ⅔ of the highest value. Alternatively, the number of dots can be increased if the data is greater than or equal to half of the highest value. Alternatively, the image data obtained by the density conversion processing may be stored until completion of the quantization processing, and the binarized data may be compared with the image data obtained by the density conversion. Still alternatively, as another method for increasing the number of dots after the image data is converted into binary data, the number of dots that is to be formed by the defective discharge port may be counted for any of certain regions, and the number of dots may be increased by the number corresponding to the number of dots to be formed by the defective discharge port.

In the first exemplary embodiment, in the output gamma processing, the image processing unit 134 increases the values of the ink color data corresponding to the defective discharge port by applying the boosted output gamma on the ink color data so that dots are more likely to be formed. On the other hand, in the fourth exemplary embodiment, the image processing unit 134 lowers the thresholds in the threshold matrix corresponding to the defective discharge port in the quantization processing so that dots are more likely to be formed.

In a sixth exemplary embodiment, by using both of the methods, the image processing unit 134 increases the number of dots on the pixels corresponding to the defective discharge port. More specifically, the image processing unit 134 performs image data processing in which the values of the ink color data corresponding to the defective discharge port are increased by performing the boosted output gamma processing and in which the thresholds in the threshold matrix in the quantization processing are lowered. For example, the image processing unit 134 may use a look-up table that increases half of values in the multi-valued data to be increased by the look-up table as illustrated in FIGS. 10A to 10D used in the first exemplary embodiment. For the other half of the values in the multi-valued data that is to be increased, the image processing unit 134 subtracts values from the thresholds in the threshold matrix in FIG. 16A. In this way, the image processing unit 134 can increase the number of dots for the defective discharge port by the same number of dots for the defective discharge port increased in the first exemplary embodiment.

The above exemplary embodiments have been described using a case where there is only one defective discharge port. In a case where there are two or more defective discharge ports, the same processing as the one performed on the one defective discharge port is applied to each of the plurality of defective discharge ports. FIGS. 5B and 5D illustrate a specific example in which the discharge ports seg5 and seg7 are defective discharge ports.

In addition, in a case where a plurality of discharge ports correspond to data of a single pixel, a different table may be used depending on the number of defective discharge ports. Sine only one of the discharge ports seg5 is a defective discharge port in FIG. 7A, the defective discharge attribute of C indicates 1. However, since two of the defective discharge ports of seg9 are defective, the defective discharge attribute of C indicates 2. In this state, it is expected that a larger stripe is formed by the discharge ports seg9 than that formed by the discharge port seg5, which performs only one defective discharge. Thus, different look-up tables are applied to two cases so that the output ink color data will be higher in a case where the defective discharge port attribute indicates "2" than that in a case where the defective discharge port attribute indicates "1" in the density conversion processing.

The above exemplary embodiments have been descried using the mode where the image processing unit 134 in the printing apparatus performs all the processing in steps S401 to S407 and steps S411 to S418. However, other modes are also possible. For example, the host apparatus HC1 may perform all the processing in steps S401 to S407 and steps S411 to S418. Alternatively, for example, the host apparatus HC1 or the upper-level apparatus HC2 and the printing apparatus may perform the processing as a system. More specifically, the host apparatus HC1 or the upper-level apparatus HC2 may perform the processing up to the density conversion processing (step S405), and the printing control system 13 may perform the quantization processing (step S406) and the subsequent processing. Still alternatively, the upper-level apparatus HC2 may perform all or a part of steps S401 to S407, and the printing control system 13 may perform printing based on the dot data transmitted thereto.

In addition, the image data may be information in which each of the RGB values is constituted of information other than 8-bit information. The ink color (CMYK) data may be information in which each of the CMYK values is constituted of information other than 8-bit information.

In addition, the image data may have a resolution other than 600 dpi×600 dpi and 1,200 dpi×1,200 dpi.

In addition, the above exemplary embodiments have been described by using an ink jet printing apparatus as an example. However, the processing in any of the above exemplary embodiments is applicable to a case where an element (faulty element) malfunctions and becomes unable to perform normal printing in a thermal printer that performs printing by using thermal paper or a thermal ribbon.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the aspect of the embodiments, the dot data is generated such that the number of dots of a faulty pixel is increased from the number of dots of a normal pixel so that the number of dots to be complemented by a pixel at a neighboring position can be increased. Accordingly, compared to a case where the number of dots thereof is not increased, it is possible to increase a probability that the pixel at the neighboring position prints more dots for complementary purposes, thereby enabling more effective complementary printing.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-054867, filed Mar. 22, 2018, which is hereby incorporated by reference herein in its entirety.

What is claimed is:

1. An apparatus comprising:
a printing head provided with a plurality of elements arrayed in a predetermined direction for forming dots on a printing medium and configured to form dots on the printing medium by using the plurality of elements based on dot data indicating whether to form dots;
a generation unit configured to generate the dot data for the plurality of elements by performing a quantization process on multi-valued input image data;
an acquisition unit configured to acquire identification information that identifies a faulty element that is unable to form dots properly on the printing medium from among the plurality of elements; and
a complementary unit configured to generate complementary dot data for the faulty element by taking the dot data generated for the identified faulty element as dot data corresponding to an element near the identified element in the predetermined direction,
wherein, in a case where one element of the elements is identified as a faulty element, the generation unit performs at least one of correction processing for increasing a value of the multi-valued input image data for a pixel corresponding to the one element and correction processing for decreasing a threshold in the quantization process for the pixel corresponding to the one element.

2. The apparatus according to claim 1, wherein, regarding a difference in a number of dots in the dot data for one of the elements between a case where the element is identified as a faulty element and a case where the element is not identified as a faulty element, the generation unit generates the dot data for the element so that a difference corresponding to a case where the input image data for the element indicates a first printing density is less than a difference corresponding to a case where the input image data for the element indicates a second printing density higher than the first printing density.

3. The apparatus according to claim 1, wherein, regarding a difference in the value of the multi-valued input image data between a case where one of the elements is identified as a faulty element and a case where one of the elements is not identified as a faulty element, the generation unit performs the correction processing for increasing the value of the multi-valued input image data for the pixel corresponding to the element so that the difference corresponding to a case where the input image data for the element indicates a first printing density is less than the difference corresponding to a case where the input image data for the element indicates a second printing density higher than the first printing density.

4. The apparatus according to claim 3, wherein, in a case where the input image data indicates a printing density lower than a predetermined value, the generation unit sets the value of the multi-valued input image data in the case where the element is identified as a faulty element to be the same as the value of the multi-valued input image data in the case where the element is not identified as a faulty element.

5. The apparatus according to claim 4,
wherein the generation unit generates the multi-valued input image data on which the quantization process is performed by using a table that defines an output value with respect to an input value of the input image data,
wherein, in the case where the element is not identified as a faulty element, the generation unit uses a normal table, and
wherein, in the case where the element is identified as a faulty element, the generation unit performs correction processing by using a table for the faulty element in which an output value with respect to an input value is higher than that in the normal table.

6. The apparatus according to claim 1, wherein, in the case where one of the elements is identified as a faulty element, the generation unit performs the correction processing for increasing the value of the multi-valued input image data corresponding to the element and performs the quantization process by using the same threshold for the pixel corresponding to the element as that used in the case where the element is not identified as a faulty element.

7. The apparatus according to claim 1, wherein, in the case where one of the elements is identified as a faulty element, the generation unit performs the correction processing for decreasing the threshold without changing the value of the multi-valued input image data for the pixel corresponding to the element, from the value in the case where the element is not identified as a faulty element.

8. The apparatus according to claim 1, wherein the multi-valued input image data corresponding to the element before the generation unit performs the correction processing represents a value less than a maximum gradation value.

9. The apparatus according to claim 1, wherein, in a case where a dot printed on the printing medium has a higher resolution than that of the input image data in the predetermined direction, the generation unit performs at least one of correction processing for increasing values of the multi-valued input image data corresponding to the element identified as a faulty element and an element neighboring the element in the predetermined direction in the input image data and correction processing for decreasing the threshold.

10. The apparatus according to claim 1, wherein the complementary unit generates complementary dot data for the faulty element by taking the dot data generated for the identified faulty element as dot data corresponding to an element two elements away from the identified faulty element in the predetermined direction.

11. The apparatus according to claim 1, wherein the complementary unit generates complementary dot data for the faulty element by taking the dot data generated for the identified faulty element as dot data corresponding to an element that neighbors the identified faulty element in the predetermined direction.

12. The apparatus according to claim 1, wherein the printing head includes an ink discharge port at a position corresponding to the element and forms dots by discharging ink from the discharge port when the element generates energy.

13. The apparatus according to claim 11, wherein the faulty element that is unable to form dots properly on the printing medium is an element is a clogged discharge port that is unable to discharge ink properly.

14. The apparatus according to claim 1, further comprising;
an identification unit configured to identify the element that is unable to form dots properly by driving the element; and
a storage unit configured to store the identification information indicating the element identified by the identification unit,
wherein the acquisition unit acquires the identification information stored in the storage unit.

15. An apparatus comprising:
a printing head configured to include a plurality of elements arrayed in a predetermined direction for forming dots on a printing medium and form dots on the printing medium by using the plurality of elements based on dot data indicating whether to form dots;
a generation unit configured to quantize multi-valued input image data and generate the dot data for the plurality of elements by using an index pattern that determines arrangement of dots corresponding to the quantized data;
an acquisition unit configured to acquire identification information that identifies a faulty element that is unable to form dots properly on the printing medium from among the plurality of elements; and
a complementary unit configured to generate complementary dot data for the faulty element by taking the dot data generated for the identified faulty element as dot data corresponding to an element near the identified element in the predetermined direction,
wherein, in a case where any one of the elements is identified as a faulty element, the generation unit generates dot data for the faulty element by using an index pattern including more dots within the index pattern than dots in an index pattern used in a case where the element is not identified as a faulty element.

16. A method comprising:
generating dot data for a plurality of elements arrayed in a predetermined direction to form dots by performing a quantization process on multi-valued input image data;
identifying a faulty element that is unable to form dots properly on a printing medium from among the plurality of elements that form dots on the printing medium based on the dot data; and
generating complementary dot data for the faulty element by taking the dot data generated for the identified faulty element as dot data corresponding to an element near the identified element in the predetermined direction,
wherein, in the generating of the dot data, in a case where one element of the elements is identified as a faulty element, at least one of correction processing for increasing a value of the multi-valued input image data for a pixel corresponding to the element and correction processing for decreasing a threshold in the quantization process for the pixel corresponding to the element is performed.

17. The method according to claim 16, wherein, regarding a difference in the value of the multi-valued input image data between a case where one of the elements is identified as a faulty element and a case where one of the elements is not identified as a faulty element, in the generating of the dot data, the correction processing for increasing the value of the multi-valued input image data for the pixel corresponding to the element is performed so that the difference corresponding to a case where the input image data for the element indicates a first printing density is less than the difference corresponding to a case where the input image data for the element indicates a second printing density higher than the first printing density.

18. The method according to claim 16, wherein, in the case where one of the elements is identified as a faulty element, in the generating of the dot data, the correction processing for increasing the value of the multi-valued input image data corresponding to the element is performed while the quantization process is performed without changing the threshold.

19. The method according to claim 16, wherein, in the case where one of the elements is identified as a faulty element, in the generating of the dot data, the correction processing for decreasing the threshold is performed without changing the value of the multi-valued input image data.

20. A system comprising:
a printing head provided with a plurality of elements arrayed in a predetermined direction for forming dots on a printing medium and configured to form dots on the printing medium by using the plurality of elements based on dot data indicating whether to form dots;
a generation unit configured to generate the dot data for the plurality of elements by performing a quantization process on multi-valued input image data;
an acquisition unit configured to acquire identification information that identifies a faulty element that is unable to form dots properly on the printing medium from among the plurality of elements; and
a complementary unit configured to generate complementary dot data for the faulty element by taking the dot data generated for the identified faulty element as dot data corresponding to an element near the identified element in the predetermined direction,
wherein, in a case where one of the elements is identified as a faulty element, the generation unit performs at least one of correction processing for increasing a value of the multi-valued input image data for a pixel corresponding to the one element and correction processing for decreasing a threshold in the quantization process for the pixel corresponding to the one element.

* * * * *